(12) United States Patent
Sturges et al.

(10) Patent No.: US 8,474,043 B2
(45) Date of Patent: Jun. 25, 2013

(54) SPEED AND MEMORY OPTIMIZATION OF INTRUSION DETECTION SYSTEM (IDS) AND INTRUSION PREVENTION SYSTEM (IPS) RULE PROCESSING

(75) Inventors: Steven Sturges, Ellicott City, MD (US); Marc Norton, Eldersburg, MD (US)

(73) Assignee: Sourcefire, Inc., Columbia, MD (US)

( * ) Notice: Subject to any disclaimer, the term of this patent is extended or adjusted under 35 U.S.C. 154(b) by 452 days.

(21) Appl. No.: 12/230,338

(22) Filed: Aug. 28, 2008

(65) Prior Publication Data

US 2009/0262659 A1 Oct. 22, 2009

Related U.S. Application Data

(60) Provisional application No. 61/071,200, filed on Apr. 17, 2008.

(51) Int. Cl.
*H04L 29/06* (2006.01)
(52) U.S. Cl.
USPC .......................................................... 726/23
(58) Field of Classification Search
None
See application file for complete search history.

(56) References Cited

U.S. PATENT DOCUMENTS

| | | | |
|---|---|---|---|
| 4,550,436 A | 10/1985 | Freeman |
| 4,570,157 A | 2/1986 | Kodaira |
| 4,857,912 A | 8/1989 | Everett, Jr. et al. |
| 4,912,748 A | 3/1990 | Horii et al. |
| 4,985,863 A | 1/1991 | Fujisawa et al. |
| 5,193,192 A | 3/1993 | Seberger |
| 5,222,081 A | 6/1993 | Lewis et al. |
| 5,404,488 A | 4/1995 | Kerrigan et al. |
| 5,430,842 A | 7/1995 | Thompson et al. |
| 5,459,841 A | 10/1995 | Flora-Holmquist et al. |
| 5,495,409 A | 2/1996 | Kanno |
| 5,497,463 A | 3/1996 | Stein et al. |
| 5,604,910 A | 2/1997 | Kojima et al. |
| 5,646,997 A | 7/1997 | Barton |
| 5,666,293 A | 9/1997 | Metz et al. |

(Continued)

FOREIGN PATENT DOCUMENTS

| | | |
|---|---|---|
| EP | 2166725 A1 | 3/2010 |
| GB | 2 432 933 A | 6/2007 |

(Continued)

OTHER PUBLICATIONS

U.S. Appl. No. 12/969,682, filed Dec. 2010, Roesch et al.

(Continued)

*Primary Examiner* — Shaun Gregory
(74) *Attorney, Agent, or Firm* — Posz Law Group, PLC

(57) ABSTRACT

In an intrusion detection/prevention system, network traffic is received and checked for a matching pattern. Upon identifying the matching pattern, the network traffic with the matching pattern is evaluated against rules that are represented by a rule tree. References to rule options are represented in the rule tree and are stored separately from the rule tree. The rule tree represents unique rules by unique paths from a root of the tree to the leaf nodes, and represents rule options as non-leaf nodes of the rule tree. Evaluating the network traffic includes processing, against the network traffic, the rule options in the rule tree beginning at the root. Processing of the rules represented by subtrees of nodes with rule options that do not match is eliminated. The network traffic is evaluated against rules terminating in leaf nodes only for combinations of rule options that match the network traffic.

23 Claims, 10 Drawing Sheets

U.S. PATENT DOCUMENTS

| | | | |
|---|---|---|---|
| 5,796,942 | A | 8/1998 | Esbensen |
| 5,870,554 | A | 2/1999 | Grossman et al. |
| 5,881,269 | A | 3/1999 | Dobbelstein |
| 5,901,307 | A | 5/1999 | Potter et al. |
| 5,917,821 | A | 6/1999 | Gobuyan et al. |
| 5,919,257 | A | 7/1999 | Trostle |
| 5,963,942 | A | 10/1999 | Igata |
| 5,987,473 | A | 11/1999 | Jorgensen |
| 5,995,963 | A | 11/1999 | Nanba et al. |
| 5,999,937 | A | 12/1999 | Ellard |
| 6,002,427 | A | 12/1999 | Kipust |
| 6,141,686 | A | 10/2000 | Jackowski et al. |
| 6,199,181 | B1 | 3/2001 | Rechef et al. |
| 6,219,786 | B1 | 4/2001 | Cunningham et al. |
| 6,240,452 | B1 | 5/2001 | Welch, Jr. et al. |
| 6,259,805 | B1 | 7/2001 | Freedman et al. |
| 6,320,848 | B1 | 11/2001 | Edwards et al. |
| 6,321,338 | B1 | 11/2001 | Porras et al. |
| 6,324,656 | B1 | 11/2001 | Gleichauf et al. |
| 6,334,121 | B1 | 12/2001 | Primeaux et al. |
| 6,343,362 | B1 | 1/2002 | Ptacek et al. |
| 6,393,474 | B1 | 5/2002 | Eichert et al. |
| 6,415,321 | B1 | 7/2002 | Gleichauf et al. |
| 6,453,354 | B1 | 9/2002 | Jiang et al. |
| 6,477,648 | B1 | 11/2002 | Schell et al. |
| 6,487,666 | B1 | 11/2002 | Shanklin et al. |
| 6,499,107 | B1 | 12/2002 | Gleichauf et al. |
| 6,539,381 | B1 | 3/2003 | Prasad et al. |
| 6,546,493 | B1 | 4/2003 | Magdych et al. |
| 6,587,876 | B1 | 7/2003 | Mahon et al. |
| 6,590,885 | B1 | 7/2003 | Jorgensen |
| 6,678,734 | B1 | 1/2004 | Haatainen et al. |
| 6,678,824 | B1 | 1/2004 | Cannon et al. |
| 6,684,332 | B1 | 1/2004 | Douglas |
| 6,711,127 | B1 | 3/2004 | Gorman et al. |
| 6,754,826 | B1 | 6/2004 | Challenger et al. |
| 6,766,320 | B1 | 7/2004 | Wang et al. |
| 6,772,196 | B1 | 8/2004 | Kirsch et al. |
| 6,789,202 | B1 | 9/2004 | Ko et al. |
| 6,816,973 | B1 | 11/2004 | Gleichauf et al. |
| 6,851,061 | B1 | 2/2005 | Holland et al. |
| 6,957,348 | B1 | 10/2005 | Flowers et al. |
| 6,983,323 | B2 | 1/2006 | Cantrell et al. |
| 6,993,706 | B2 | 1/2006 | Cook |
| 6,999,998 | B2 | 2/2006 | Russell |
| 7,032,114 | B1 | 4/2006 | Moran |
| 7,047,423 | B1 | 5/2006 | Maloney et al. |
| 7,054,930 | B1 | 5/2006 | Cheriton |
| 7,058,821 | B1 * | 6/2006 | Parekh et al. ............... 713/194 |
| 7,065,657 | B1 | 6/2006 | Moran |
| 7,073,198 | B1 | 7/2006 | Flowers et al. |
| 7,076,803 | B2 | 7/2006 | Bruton et al. |
| 7,096,503 | B1 | 8/2006 | Magdych et al. |
| 7,113,789 | B1 | 9/2006 | Boehmke |
| 7,120,635 | B2 | 10/2006 | Bhide et al. |
| 7,133,916 | B2 | 11/2006 | Schunemann |
| 7,134,141 | B2 | 11/2006 | Crosbie et al. |
| 7,152,105 | B2 | 12/2006 | McClure et al. |
| 7,174,566 | B2 | 2/2007 | Yadav |
| 7,181,769 | B1 | 2/2007 | Keanini et al. |
| 7,231,665 | B1 | 6/2007 | McArdle et al. |
| 7,243,148 | B2 | 7/2007 | Keir et al. |
| 7,257,630 | B2 | 8/2007 | Cole et al. |
| 7,305,708 | B2 | 12/2007 | Norton et al. |
| 7,310,688 | B1 | 12/2007 | Chin |
| 7,313,695 | B2 | 12/2007 | Norton et al. |
| 7,315,801 | B1 | 1/2008 | Dowd et al. |
| 7,317,693 | B1 | 1/2008 | Roesch et al. |
| 7,346,922 | B2 | 3/2008 | Miliefsky |
| 7,350,077 | B2 | 3/2008 | Meier et al. |
| 7,363,656 | B2 | 4/2008 | Weber et al. |
| 7,365,872 | B2 | 4/2008 | Lawrence et al. |
| 7,467,202 | B2 | 12/2008 | Savchuk |
| 7,467,410 | B2 | 12/2008 | Graham et al. |
| 7,493,388 | B2 | 2/2009 | Wen et al. |
| 7,519,954 | B1 | 4/2009 | Beddoe et al. |
| 7,580,370 | B2 | 8/2009 | Boivie et al. |
| 7,594,273 | B2 | 9/2009 | Keanini et al. |
| 7,596,807 | B2 | 9/2009 | Ptacek et al. |
| 7,644,275 | B2 | 1/2010 | Mowers et al. |
| 7,664,845 | B2 | 2/2010 | Kurtz et al. |
| 7,673,043 | B2 | 3/2010 | Keir et al. |
| 7,680,929 | B1 | 3/2010 | Lyon |
| 7,730,011 | B1 | 6/2010 | Deninger et al. |
| 7,801,980 | B1 | 9/2010 | Roesch et al. |
| 7,805,482 | B2 | 9/2010 | Schiefer |
| 7,805,762 | B2 | 9/2010 | Rowland |
| 7,831,522 | B1 | 11/2010 | Satish et al. |
| 7,885,190 | B1 | 2/2011 | Roesch et al. |
| 7,949,732 | B1 | 5/2011 | Roesch et al. |
| 8,020,211 | B2 | 9/2011 | Keanini et al. |
| 8,041,773 | B2 | 10/2011 | Abu-Ghazaleh et al. |
| 8,272,055 | B2 | 9/2012 | Wease |
| 8,289,882 | B2 | 10/2012 | Vogel, III et al. |
| 2001/0027485 | A1 | 10/2001 | Ogishi et al. |
| 2001/0034847 | A1 | 10/2001 | Gaul, Jr. |
| 2002/0035639 | A1 | 3/2002 | Xu |
| 2002/0066034 | A1 | 5/2002 | Schlossberg |
| 2002/0083344 | A1 | 6/2002 | Vairavan |
| 2002/0087716 | A1 | 7/2002 | Mustafa |
| 2002/0112185 | A1 | 8/2002 | Hodges |
| 2002/0123995 | A1 | 9/2002 | Shibuya |
| 2002/0143918 | A1 | 10/2002 | Soles et al. |
| 2002/0144142 | A1 | 10/2002 | Shohat |
| 2002/0165707 | A1 | 11/2002 | Call |
| 2002/0168082 | A1 | 11/2002 | Razdan |
| 2002/0178271 | A1 | 11/2002 | Graham et al. |
| 2003/0009699 | A1 | 1/2003 | Gupta et al. |
| 2003/0014662 | A1 | 1/2003 | Gupta et al. |
| 2003/0046388 | A1 | 3/2003 | Milliken |
| 2003/0065817 | A1 | 4/2003 | Benchetrit et al. |
| 2003/0083847 | A1 | 5/2003 | Schertz et al. |
| 2003/0093517 | A1 | 5/2003 | Tarquini et al. |
| 2003/0101353 | A1 | 5/2003 | Tarquini et al. |
| 2003/0126472 | A1 | 7/2003 | Banzhof |
| 2003/0140250 | A1 | 7/2003 | Taninaka et al. |
| 2003/0195874 | A1 | 10/2003 | Akaboshi |
| 2003/0212779 | A1 | 11/2003 | Boyter et al. |
| 2003/0212910 | A1 | 11/2003 | Rowland et al. |
| 2003/0217283 | A1 | 11/2003 | Hrastar et al. |
| 2003/0229726 | A1 | 12/2003 | Daseke et al. |
| 2004/0010684 | A1 | 1/2004 | Douglas |
| 2004/0015728 | A1 | 1/2004 | Cole et al. |
| 2004/0034773 | A1 | 2/2004 | Balabine et al. |
| 2004/0064726 | A1 | 4/2004 | Girouard |
| 2004/0073800 | A1 | 4/2004 | Shah et al. |
| 2004/0093408 | A1 | 5/2004 | Hirani et al. |
| 2004/0093582 | A1 | 5/2004 | Segura |
| 2004/0098618 | A1 | 5/2004 | Kim et al. |
| 2004/0117478 | A1 | 6/2004 | Triulzi et al. |
| 2004/0123153 | A1 | 6/2004 | Wright et al. |
| 2004/0172234 | A1 | 9/2004 | Dapp et al. |
| 2004/0179477 | A1 | 9/2004 | Lincoln et al. |
| 2004/0193943 | A1 | 9/2004 | Angelino et al. |
| 2004/0210756 | A1 | 10/2004 | Mowers et al. |
| 2004/0218532 | A1 | 11/2004 | Khirman |
| 2004/0221176 | A1 | 11/2004 | Cole |
| 2004/0250032 | A1 | 12/2004 | Ji et al. |
| 2004/0268358 | A1 | 12/2004 | Darling et al. |
| 2005/0005169 | A1 | 1/2005 | Kelekar |
| 2005/0015623 | A1 | 1/2005 | Williams et al. |
| 2005/0044422 | A1 | 2/2005 | Cantrell et al. |
| 2005/0055399 | A1 | 3/2005 | Savchuk |
| 2005/0076066 | A1 | 4/2005 | Stakutis et al. |
| 2005/0108393 | A1 | 5/2005 | Banerjee et al. |
| 2005/0108573 | A1 | 5/2005 | Bennett et al. |
| 2005/0113941 | A1 | 5/2005 | Ii et al. |
| 2005/0114700 | A1 | 5/2005 | Barrie et al. |
| 2005/0160095 | A1 | 7/2005 | Dick et al. |
| 2005/0172019 | A1 | 8/2005 | Williamson et al. |
| 2005/0188079 | A1 | 8/2005 | Motsinger et al. |
| 2005/0223014 | A1 | 10/2005 | Sharma et al. |
| 2005/0229255 | A1 | 10/2005 | Gula et al. |
| 2005/0240604 | A1 | 10/2005 | Corl, Jr. et al. |
| 2005/0251500 | A1 | 11/2005 | Vahalia et al. |
| 2005/0268331 | A1 | 12/2005 | Le et al. |
| 2005/0268332 | A1 | 12/2005 | Le et al. |

| | | |
|---|---|---|
| 2005/0273673 A1 | 12/2005 | Gassoway |
| 2005/0273857 A1 | 12/2005 | Freund |
| 2006/0174337 A1 | 8/2006 | Bernoth |
| 2006/0265748 A1 | 11/2006 | Potok |
| 2006/0288053 A1 | 12/2006 | Holt et al. |
| 2006/0294588 A1 | 12/2006 | Lahann et al. |
| 2007/0027913 A1 | 2/2007 | Jensen et al. |
| 2007/0058631 A1 | 3/2007 | Mortier et al. |
| 2007/0143852 A1 | 6/2007 | Keanini et al. |
| 2007/0162463 A1 | 7/2007 | Kester et al. |
| 2007/0192863 A1 | 8/2007 | Kapoor et al. |
| 2007/0195797 A1 | 8/2007 | Patel et al. |
| 2007/0271371 A1 | 11/2007 | Singh Ahuja et al. |
| 2007/0283007 A1 | 12/2007 | Keir et al. |
| 2007/0283441 A1 | 12/2007 | Cole et al. |
| 2007/0288579 A1 | 12/2007 | Schunemann |
| 2008/0115213 A1 | 5/2008 | Bhatt et al. |
| 2008/0168561 A1 | 7/2008 | Durie et al. |
| 2008/0263197 A1 | 10/2008 | Stephens |
| 2008/0289040 A1 | 11/2008 | Ithal |
| 2009/0019141 A1 | 1/2009 | Bush et al. |
| 2009/0028147 A1 | 1/2009 | Russell |
| 2009/0041020 A1 | 2/2009 | Gibbons et al. |
| 2009/0055691 A1 | 2/2009 | Ouksel et al. |
| 2009/0164517 A1 | 6/2009 | Shields et al. |
| 2009/0171981 A1 | 7/2009 | Shuster |
| 2009/0182864 A1 | 7/2009 | Khan et al. |
| 2009/0259748 A1 | 10/2009 | McClure et al. |
| 2009/0271696 A1 | 10/2009 | Bailor et al. |
| 2009/0282481 A1 | 11/2009 | Dow et al. |
| 2009/0320138 A1 | 12/2009 | Keanini et al. |
| 2010/0050260 A1 | 2/2010 | Nakakoji et al. |
| 2010/0077483 A1 | 3/2010 | Stolfo et al. |
| 2010/0161795 A1 | 6/2010 | Deridder et al. |
| 2010/0268834 A1 | 10/2010 | Eidelman et al. |
| 2011/0307600 A1 | 12/2011 | Polley et al. |
| 2011/0314143 A1 | 12/2011 | Vogel, III et al. |
| 2012/0233222 A1 | 9/2012 | Roesch |

FOREIGN PATENT DOCUMENTS

| | | | |
|---|---|---|---|
| WO | WO 01/37511 | A2 | 5/2001 |
| WO | WO 2004/100011 | A1 | 11/2004 |
| WO | WO 2005/064884 | A1 | 7/2005 |
| WO | WO 2006/025050 | A2 | 3/2006 |
| WO | WO 2009/032925 | A1 | 3/2009 |

OTHER PUBLICATIONS

Notice of Allowance issued by the U.S. Patent Office on Oct. 5, 2010 in connection with related U.S. Appl. No. 10/843,374.
International Preliminary Report on Patentability mailed on Oct. 19, 2010 in connection with the corresponding PCT application No. PCT/US2009/002210.
Final Office Action issued by the U.S. Patent Office on Oct. 25, 2010 in connection with related U.S. Appl. No. 11/272,035.
Final Office Action issued by the U.S. Patent Office on Nov. 4, 2010 in connection with related U.S. Appl. No. 10/843,459.
Office Action issued by the U.S. Patent Office on Nov. 19, 2010 in connection with related U.S. Appl. No. 10/843,459.
Final Office Action issued by the U.S. Patent Office on Nov. 24, 2010 in connection with related U.S. Appl. No. 12/010,900.
Office Action issued by the U.S. Patent Office on Dec. 22, 2010 in connection with related U.S. Appl. No. 11/905,980.
Office Action issued by the U.S. Patent Office on Oct. 6, 2008 in connection with related U.S. Appl. No. 10/843,374.
Notice of Allowance issued by the U.S. Patent Office on Oct. 15, 2008 in connection with related U.S. Appl. No. 10/951,796.
Notice of Allowance issued by the U.S. Patent Office on Oct. 21, 2008 in connection with related U.S. Appl. No. 10/843,375.
European Office Action issued by the European Patent Office on Nov. 28, 2008 in connection with European patent application No. 07 015 003.2-2413, which corresponds to related U.S. Appl. No. 11/501,776.
Office Action issued by the U.S. Patent Office on Dec. 17, 2008 in connection with related U.S. Appl. No. 10/843,398.
Office Action issued by the U.S. Patent Office on Dec. 23, 2008 in connection with related U.S. Appl. No. 11/272,034.

J. Howe, "An Environment for 'Sniffing' DCE-RPC Traffic," *CITI Technical Report 93-4*, Jun. 21, 1993, 12 pages total.
European Search Report issued by the European Patent Office on Oct. 12, 2009 in connection with European patent application No. 05773501.1-2201, which corresponds to related U.S. Appl. Nos. 10/898,220, 11/785,609 and 12/010,900.
Final Office Action issued by the U.S. Patent Office on Oct. 29, 2009 in connection with related U.S. Appl. No. 11/501,776.
International Preliminary Report on Patentability mailed on Nov. 12, 2009 in connection with PCT application No. PCT/US08/005466, which corresponds to U.S. Appl. No. 12/149,196.
Advisory Action issued by the U.S. Patent Office on Dec. 2, 2009 in connection with related U.S. Appl. No. 10/843,398.
Notice of Allowance issued by the U.S. Patent Office on Dec. 8, 2009 in connection with related U.S. Appl. No. 11/501,776.
Final Office Action issued by the U.S. Patent Office on Dec. 8, 2009 in connection with related U.S. Appl. No. 11/272,034.
Final Office Action issued by the U.S. Patent Office on Dec. 9, 2009 in connection with related U.S. Appl. No. 11/272,035.
Office Action issued by the U.S. Patent Office on Dec. 17, 2009 in connection with related U.S. Appl. No. 11/493,934.
"Snort™ Users Manual 2.2.0RC1," *The Snort Project*, Jun. 28, 2004, Retrieved from the Internet: URL:http://cvs.snort.org/viewcvs.cgi/*checkout*/snort/doc/snort_manual.pdf?rev=1.25&content-type=application/pdf [retrieved on Nov. 18, 2010] (XP002610157).
V. Yegneswaran, et al., "Internet Sieve: An Architecture for Generating Resilient Signatures," May 2004, Retrieved from the Internet: URL:http://www.cc.gatech.edu/~giffin/papers/tr1507/tr1507.pdf [retrieved on Nov. 18, 2010] (XP002610154).
D. Roekler, "HTTP IDS Evasions Revisited," Jan. 8, 2003, Retrieved from the Internet: URL:http://docs.idsresearch.org/http_ids_evasions.pdf [Nov. 18, 2010] (XP002610155).
M. Norton, et al., "The New Snort," *Computer Security Journal*, CSI Security Institute, XIX, No. 3 (Jan. 1, 2003), pp. 37-47, ISSN: 0277-0865 (XP008039475).
European Search Report issued by the European Patent Office on Dec. 6, 2010 in connection with European patent application No. 05773540.9-2413, which corresponds to related U.S. Patent No. 7,496,962.
Notice of Allowance issued by the U.S. Patent Office on Jan. 24, 2011 in connection with related U.S. Appl. No. 10/843,459.
Notice of Allowance issued by the U.S. Patent Office on Feb. 24, 2011 in connection with related U.S. Appl. No. 11/493,934.
R. Gula, "Passive Vulnerability Detection. *Techniques to passively find network security vulnerabilities*," Sep. 9, 1999 (5 pp.).
R.P. Lippmann et al., "Passive Operating System Identification from TCP/IP Packet Headers," *Proceedings Workshop on Data Mining for Computer Security (DMSEC)*, Nov. 2003 (10 pp.).
N. Brownlee, et al., "Methodology for Passive Analysis of a University Internet Link," *PAM2001 Passive and Active Measurement Workshop*, Apr. 2001 (7 pp.).
Notice of Allowance issued by the U.S. Patent Office on Jan. 7, 2010 in connection with related U.S. Appl. No. 10/843,353.
Notice of Allowance issued by the U.S. Patent Office on Jan. 8, 2010 in connection with related U.S. Appl. No. 10/843,373.
Office Action issued by the European Patent Office on Jan. 15, 2010 in connection with European patent application No. 05773501.1-2201, which corresponds to related U.S. Appl. Nos. 10/898,220, 11/785,609 and 12/010,900.
Advisory Action issued by the U.S. Patent Office on Feb. 24, 2010 in connection with related U.S. Appl. No. 11/272,035.
Office Action issued by the U.S. Patent Office on Mar. 22, 2010 in connection with related U.S. Appl. No. 11/493,934.
Notice of Allowance issued by the U.S. Patent Office on Mar. 5, 2010 in connection with related U.S. Appl. No. 11/785,609.
Final Office Action issued by the U.S. Patent Office on Mar. 17, 2010 in connection with related U.S. Appl. No. 10/843,374.
Notice of Allowance issued by the U.S. Patent Office on Feb. 5, 2010 in connection with related U.S. Appl. No. 11/272,034.
Office Action issued by the U.S. Patent Office on Mar. 16, 2010 in connection with related U.S. Appl. No. 11/272,035.

International Search Report and Written Opinion of the International Searching Authority issued on Mar. 16, 2010 in connection with PCT application No. PCT/US09/59965, which corresponds to U.S. Appl. No. 12/575,612.

Office Action issued by the U.S. Patent Office on Jan. 16, 2009 in connection with related U.S. Appl. No. 10/843,353.

Office Action issued by the U.S. Patent Office on Jan. 21, 2009 in connection with related U.S. Appl. No. 11/493,934.

Notice of Allowance issued by the U.S. Patent Office on Jan. 21, 2009 in connection with related U.S. Appl. No. 10/898,220.

Office Action issued by the U.S. Patent Office on Feb. 4, 2009 in connection with related U.S. Appl. No. 10/843,373.

Office Action issued by the U.S. Patent Office on Feb. 9, 2009 in connection with related U.S. Appl. No. 10/843,459.

International Preliminary Report on Patentability and Written Opinion of the International Searching Authority mailed on Mar. 3, 2009 in connection with PCT application No. PCT/US05/025584, which corresponds to related U.S. Appl. No. 10/898,220.

International Preliminary Report on Patentability and Written Opinion of the International Searching Authority mailed on Mar. 17, 2009 in connection with corresponding PCT application No. PCT/US06/43820, which corresponds to related U.S. Appl. No. 11/272,035.

U.S. Appl. No. 12/813,859, filed Jun. 2010, Polley et al.

V. Jacobson, et al., Request for Comments: 1323, "TCP Extensions for High Performance," May 1992 (35 pages).

D. Joseph, et al., "A Policy-aware Switching Layer for Data Centers," *SIGCOMM*, Aug. 17-22, 2008, pp. 51-62.

Office Action issued by the U.S. Patent Office on Apr. 7, 2010 in connection with related U.S. Appl. No. 11/711,876.

Office Action issued by the U.S. Patent Office on Apr. 15, 2010 in connection with related U.S. Appl. No. 12/010,900.

Office Action issued by the U.S. Patent Office on Apr. 21, 2010 in connection with related U.S. Appl. No. 10/843,459.

Notice of Allowance issued by the U.S. Patent Office on May 24, 2010 in connection with related U.S. Appl. No. 10/843,398.

R. Deraison, et al., "Passive Vulnerability Scanning: Introduction to NeVO," *Tenable Network Security*, May 30, 2004, pp. 1-13.

Full Band and Matrix Algorithms (Jun. 9, 2004), http://web.archive.org/web20040109154658/http://www.netlib.org/utk/lsi/pcwLSI/text/node150.html.

R. Deraison, et al., "Nessus Network Auditing," *Sungress Publishing*, Jul. 20, 2004, pp. 1-13.

International Preliminary Report on Patentability mailed on Apr. 7, 2009 in connection with PCT application No. PCT/US07/021351, which corresponds to U.S. Appl. No. 11/905,980.

Office Action issued by the U.S. Patent Office on Apr. 28, 2009 in connection with related U.S. Appl. No. 11/501,776.

Final Office Action issued by the U.S. Patent Office on May 13, 2009 in connection with related U.S. Appl. No. 10/843,374.

Office Action issued by the U.S. Patent Office on May 14, 2009 in connection with related U.S. Appl. No. 11/272,034.

International Search Report and Written Opinion of the International Searching Authority mailed on May 27, 2009 in connection corresponding PCT application No. PCT/US09/02210.

Office Action issued by the U.S. Patent Office on Jun. 1, 2009 in connection with related U.S. Appl. No. 11/272,035.

Notice of Allowance issued by the U.S. Patent Office on Jun. 11, 2009 in connection with related U.S. Appl. No. 10/843,373.

Office Action issued by the U.S. Patent Office on Jun. 23, 2009 in connection with related U.S. Appl. No. 11/785,609.

Office Action issued by the U.S. Patent Office on Jul. 6, 2009 in connection with related U.S. Appl. No. 10/843,459.

Office Action issued by the U.S. Patent Office on Jul. 7, 2009 in connection with related U.S. Appl. No. 10/843,398.

Office Action issued by the U.S. Patent Office on Jul. 28, 2009 in connection with related U.S. Appl. No. 10/843,353.

Office Action issued by the U.S. Patent Office on Jul. 30, 2009 in connection with related U.S. Appl. No. 11/493,934.

Office Action issued by the U.S. Patent Office on Aug. 20, 2009 in connection with related U.S. Appl. No. 10/843,374.

International Preliminary Report on Patentability mailed on Sep. 11, 2009 in connection with PCT application No. PCT/US08/002454, which corresponds to U.S. Appl. No. 11/711,876.

Advisory Action issued by the U.S. Patent Office on Sep. 29, 2009 in connection with related U.S. Appl. No. 10/843,459.

U.S. Appl. No. 10/843,353, filed May 2004, Roesch et al., System and Method for Determining Characteristics of a Network and Analyzing Vulnerabilities.

U.S. Appl. No. 10/843,373, filed May 2004, Roesch et al., Systems and Methods for Identifying the Services of a Network.

U.S. Appl. No. 10/843,374, filed May 2004, Roesch et al., System and Methods for Determining Characteristics of a Network Based on Flow Analysis.

U.S. Appl. No. 10/843,375, filed May 2004, Roesch et al., Systems and Methods for Determining Characteristics of a Network and Assessing Confidence.

U.S. Appl. No. 10/843,398, filed May 2004, Roesch et al., Systems and Methods for Determining Characteristics of a Network.

U.S. Appl. No. 10/843,459, filed May 2004, Roesch et al., Systems and Methods for Determining Characteristics of a Network and Enforcing Policy.

U.S. Appl. No. 10/898,220, Jul. 2004, Norton et al., Methods and Systems for Multi-Pattern Searching.

U.S. Appl. No. 10/951,796, filed Sep. 2004, Roelker et al., Intrusion Detection Strategies for Hypertext Transport Protocol.

U.S. Appl. No. 11/272,033, filed Nov. 2005, Dempster et al., Systems and Methods for Identifying the Client Applications of a Network.

U.S. Appl. No. 11/272,034, filed Nov. 2005, Vogel III et al., Systems and Methods for Modifying Network Map Attributes.

U.S. Appl. No. 11/272,035, filed Nov. 2005, Gustafson et al., Intrusion Event Correlation with Network Discovery Information.

U.S. Appl. No. 11/493,934, filed Jul. 2006, Roesch et al., Device, System and Method for Analysis of Fragments in a Fragment Train.

U.S. Appl. No. 11/501,776, filed Aug. 2006, Roesch et al., Device, System and Method for Analysis of Segments in a Transmission Control Protocol (TCP) Session.

U.S. Appl. No. 11/711,876, filed Feb. 2007, Sturges et al., Device, System and Method for Timestamp Analysis of Segments in a Transmission Control Protocol (TCP) Session.

U.S. Appl. No. 11/785,609, filed Apr. 2007, Norton et al., Methods and Systems for Multi-Pattern Searching.

U.S. Appl. No. 11/905,980, filed Oct. 2007, Roesch, Device, System and Method for Use of Micro-Policies in Intrusion Detection/Prevention.

U.S. Appl. No. 12/010,900, filed Jan. 2008, Norton et al., Methods and Systems for Multi-Pattern Searching.

U.S. Appl. No. 12/149,196, filed Apr. 2008, Rittermann, Real-Time User Awareness for a Computer Network.

Aho et al., "Efficient String Matching: An Aid to Bibliographic Search," *Communications from the ACM* (Jun. 1975), vol. 18, No. 6, pp. 333-340.

Tarjan, et al., "Storing a Sparse Table," Communications of the ACM (Nov. 1979), vol. 2, No. 11, pp. 606-620.

T. Ptacek, et al., "Insertion, Evasion, and Denial of Service: Eluding Network Intrusion Detection", Jan. 1998, pp. 1-63.

N. Chase, "Active Server Pages 3.0 from Scratch" (Dec. 1999), Searching for products section, 13 pp.

L. Spitzner, "Passive Fingerprinting," *FOCUS on Intrusion Detection: Passive Fingerprinting* (May 3, 2000), pp. 1-4; obtained from: http://www.stillhq.com/pdfdb/000183/data.pdf.

B. Krishnamurthy, "Web Protocols and Practice," (May 1, 2001), pp. 518-520.

G. Lyon, "Remote OS detection via TCP/IP Stack Fingerprinting"(Jun. 30, 2002), pp. 1-12, obtained from: http://web.archive.org/web20021017063625/www.insecure.org/nmap/nmap-fingerprinting-article.html.

U. Shankar and V. Paxson, *Active Mapping: Resisting NIDS Evasion Without Altering Traffic*, Proc. IEEE Symposium in Security and Privacy. May 2003, pp. 1-18.

D. Roelker, "HTTP IDS Evasions Revisited" (Aug. 1, 2003) [online] (retrieved on Nov. 9, 2006). Retrieved from the Internet <URL: http://docs.idsresearch.org/http_ids_evasions.pdf>.

Norton et al., "Multi-Patten Search Engine Aho-Corasick State Machine" (Mar. 17, 2004), Version 2.0, 36 pp.

M. Norton, "Optimizing Pattern Matching for Intrusion Detection" (Jul. 4, 2004) [online] (retrieved on Nov. 9, 2006). Retrieved from the Internet <URL: http://docs.idsresearch.org/OptimizingPatternMatchingForIDS.pdf>.

Norton et al., "Sourcefire Optimizing Pattern Matching for Intrusion Detection" (Sep. 2004), 14 pp.

J. Novak, "Target-Based Fragmentation Reassembly" (Apr. 2005), Revision 2.0, pp. 1-32.

S.Siddharth, "Evading NIDS, revisited" (Dec. 12, 2005).

"Snort™ Users Manual 2.6.0," *The Snort Project* (May 23, 2006), pp. 1-126

"toupper()—convert lowercase character to uppercase," http://www.mkssoftware.com, printed on Sep. 20, 2008 from http://web.archive.org, archive date Jun. 30, 2006, 2 pp.

J. Novak et al., "Target-Based TCP Stream Reassembly" (Aug. 3, 2007), Revision 1.0, pp. 1-23, obtained from: http://www.snort/org/docs/stream5-modelAUg032007.pdf.

"TaoSecurity—Dedicated to FreeBSD, network security monitoring, incident response, and network forensics," (Oct. 1, 2007), obtained from: http://taosecurity.blogspot.com/2005/02/shmoocon-concludes-shmoocon-finished.html.

Office Action issued by the U.S. Patent Office on Jul. 16, 2007 in connection with related U.S. Appl. No. 10/898,220.

Office Action issued by the U.S. Patent Office on Sep. 6, 2007 in connection with related U.S. Appl. No. 10/843,374.

Notice of Allowance issued by the U.S. Patent Office on Sep. 6, 2007 in connection with related U.S. Appl. No. 10/843,376.

Office Action issued by the U.S. Patent Office on Sep. 26, 2007 in connection with related U.S. Appl. No. 10/843,353.

Office Action issued by the U.S. Patent Office on Oct. 4, 2007 in connection with related U.S. Appl. No. 10/951,796.

Notice of Allowance issued by the U.S. Patent Office on Oct. 5, 2007 in connection with related U.S. Appl. No. 10/793,887.

International Search Report and Written Opinion of the International Searching Authority issued on Oct. 9, 2007 in connection with PCT application No. PCT/US06/43800, which corresponds to U.S. Appl. No. 11/272,034.

Office Action issued by the U.S. Patent Office on Nov. 21, 2007 in connection with related U.S. Appl. No. 10/843,398.

European Search Report issued by the European Patent Office on Nov. 22, 2007 in connection with European patent application No. 07014575.0-1244, which corresponds to related U.S. Appl. No. 11/493,934.

International Search Report and Written Opinion of the International Searching Authority issued on Dec. 5, 2007 in connection with PCT application No. PCT/US05/25583, which corresponds to U.S. Appl. No. 10/951,796.

European Search Report issued by the European Patent Office on Dec. 27, 2007 in connection with European patent application No. 07015003.2-2413, which corresponds to related U.S. Appl. No. 11/501,776.

Office Action issued by the U.S. Patent Office on Jan. 10, 2008 in connection with related U.S. Appl. No. 10/843,373.

Office Action issued by the U.S. Patent Office on Feb. 5, 2008 in connection with related U.S. Appl. No. 10/843,375.

Office Action issued by the U.S. Patent Office on Feb. 21, 2008 in connection with related U.S. Appl. No. 11/272,033.

Office Action issued by the U.S. Patent Office on Mar. 12, 2008 in connection with related U.S. Appl. No. 10/843,459.

Office Action issued by the U.S. Patent Office on Mar. 20, 2008 in connection with related U.S. Appl. No. 10/843,374.

Final Office Action issued by the U.S. Patent Office on May 9, 2008 in connection with related U.S. Appl. No. 10/843,353.

International Preliminary Report on Patentability mailed on May 22, 2008 in connection with PCT application No. PCT/US06/43800, which corresponds to U.S. Appl. No. 11/272,034.

Final Office Action issued by the U.S. Patent Office on Jun. 4, 2008 in connection with related U.S. Appl. No. 10/843,398.

International Search Report and Written Opinion of the International Searching Authority issued on Jun. 19, 2008 in connection with PCT application No. PCT/US05/25584, which corresponds to U.S. Appl. No. 10/898,220.

Final Office Action issued by the U.S. Patent Office on Jun. 26, 2008 in connection with related U.S. Appl. No. 10/898,220.

International Search Report and Written Opinion of the International Searching Authority issued on Jun. 30, 2008 in connection with PCT application No. PCT/US07/21351, which corresponds to U.S. Appl. No. 11/905,980.

International Search Report and Written Opinion of the International Searching Authority issued on Jul. 2, 2008 in connection with PCT application No. PCT/US08/02454, which corresponds to U.S. Appl. No. 11/711,876.

International Search Report and Written Opinion of the International Searching Authority issued on Jul. 7, 2008 in connection with PCT application No. PCT/US06/43820, which corresponds to U.S. Appl. No. 11/272,035.

Office Action issued by the U.S. Patent Office on Jul. 11, 2008 in connection with related U.S. Appl. No. 11/272,034.

Final Office Action issued by the U.S. Patent Office on Jul. 17, 2008 in connection with related U.S. Appl. No. 10/843,459.

Final Office Action issued by the U.S. Patent Office on Aug. 6, 2008 in connection with related U.S. Appl. No. 10/843,375.

Notice of Allowance issued by the U.S. Patent Office on Aug. 18, 2008 in connection with related U.S. Appl. No. 11/272,033.

International Search Report and Written Opinion of the International Searching Authority issued on Aug. 18, 2008 in connection with PCT application No. PCT/US08/05466, which corresponds to U.S. Appl. No. 12/149,196.

Final Office Action issued by the U.S. Patent Office on Aug. 19, 2008 in connection with related U.S. Appl. No. 10/843,373.

Final Office Action issued by the U.S. Patent Office on Aug. 20, 2008 in connection with related U.S. Appl. No. 10/843,353.

U.S. Appl. No. 12/820,227, filed Jun. 2010, Vogel III, et al.

R. Hiyoshi, "Practical Guide to Intrusion Detection System: Snort & Tripwire," Japan, Apr. 25, 2004, pp. 57-230 (concise English explanation of relevance attached).

"Enhanced Operating System Identification with Nessus," Tenable Network Security (2007), obtained from: http://blog.tenablesecurity.com/2009/02/enhanced_operat.html, posted by R. Gula on Feb. 16, 2009 (3 pp. total).

Advisory Action issued by the U.S. Patent Office on Aug. 3, 2010 in connection with related U.S. Appl. No. 10/843,374.

Final Office Action issued by the U.S. Patent Office on Sep. 8, 2010 in connection with related U.S. Appl. No. 10/843,459.

Final Office Action issued by the U.S. Patent Office on Sep. 17, 2010 in connection with related U.S. Appl. No. 11/711,876.

Office Action mailed Sep. 7, 2010 from the Japan Patent Office for Japanese patent application No. 2007-523639 in connection with related U.S. Appl. No. 10/951,796, now U.S. patent No. 7,496,962 (English translation enclosed).

Final Office Action issued by the U.S. Patent Office on Sep. 30, 2010 in connection with related U.S. Appl. No. 11/493,934.

U.S. Appl. No. 13/046,127, filed Mar. 11, 2011, Roesch.

U.S. Appl. No. 13/086,819, filed Apr. 14, 2011, Olney et al.

Press Release, "FaceTime Protects Enterprises from Information Leaks over Collaborative Suites like Microsoft OCS and IBM Sametime", issued by FaceTime Communications, Belmont, California, Jul. 14, 2008, retrieved from www.facetime.com/pr/pr080714.aspx , Dec. 1, 2009.

Office Action mailed Mar. 1, 2011 from the Japan Patent Office for Japanese patent application No. 2007-523640 in connection with related U.S. Appl. No. 10/898,220, now U.S. patent No. 7,539,681, U.S. Appl. No. 11/785,609, now U.S. patent No. 7,756,885, and U.S. Appl. No. 12/010,900 (English translation enclosed).

Office Action issued by the U.S. Patent Office on Apr. 6, 2011 in connection with related U.S. Appl. No. 11/711,876.

Office Action issued by the U.S. Patent Office on May 12, 2011 in connection with related U.S. Appl. No. 12/149,196.

Notice of Allowance issued by the U.S. Patent Office on Apr. 6, 2011 in connection with related U.S. Appl. No. 12/010,900.

PCT International Preliminary Report on Patentability mailed on Apr. 21, 2011 by the International Bureau of WIPO in connection with PCT patent application No. PCT/US2009/059965, which corresponds to U.S. Appl. No. 12/575,612.

Office Action issued by the U.S. Patent Office on May 31, 2011 in connection with related U.S. Appl. No. 12/688,400.

Notice of Allowance issued by the U.S. Patent Office on Jun. 22, 2011 in connection with related U.S. Appl. No. 11/272,035.

Notice of Allowance issued by the U.S. Patent Office on Jul. 22, 2011 in connection with related U.S. Appl. No. 11/711,876.

Extended European Search Report issued by the European Patent Office on Jul. 19, 2011 in connection with European patent application No. 06837333.1-2413, which corresponds to related U.S. Patent No. 7,733,803.

International Search Report and Written Opinion of the International Searching Authority issued on Jul. 28, 2011 in connection with PCT application No. PCT/US2011/032489, which corresponds to U.S. Appl. No. 13/086,819.

Matthew Olney et al.: "What would you do with a pointer and a size? A New Detection Framework", Apr. 22, 2010, XP55002567, http://labs.snort.org/nrt/sfvrt-nrt.pdf (retrieved on Jul. 12, 2011) the whole document.

Final Office Action issued by the U.S. Patent Office on Dec. 9, 2011 in connection with related U.S. Appl. No. 12/688,400.

Office Action issued by the U.S. Patent Office on Feb. 2, 2012 in connection with related U.S. Appl. No. 12/688,400.

Office Action issued by the U.S. Patent Office on Feb. 15, 2012 in connection with related U.S. Appl. No. 12/820,227.

Office Action issued by the U.S. Patent Office on Mar. 5, 2012 in connection with related U.S. Appl. No. 12/969,682.

International Search Report and Written Opinion of the International Searching Authority issued on Sep. 1, 2011 in connection with PCT application No. PCT/US2011/035874, which corresponds to U.S. Appl. No. 12/820,227.

Francois Gagnon et al.: "A Hybrid Approach to Operating System Discovery using Answer Set Programming", Integrated Network Management, 2007. IM'07, 10$^{TH}$ IFIP/IEEE International Symposium on, IEEE, PI, May 1, 2007, pp. 391-400, XP031182713, ISBN: 978-1-4244-0798-9, p. 293, 394-397.

Office Action issued by the U.S. Patent Office on Oct. 21, 2011 in connection with related U.S. Appl. No. 12/969,682.

Notice of Allowance issued by the Japanese Patent Office on Sep. 30, 2011 in connection with Japanese Patent Application No. 2007-523640, which corresponds to related U.S. Appl. No. 10/898,220, now U.S. Patent No. 7,539,681.

Notice of Allowance issued the by U.S. Patent Office on Oct. 28, 2011 in connection with related U.S. Appl. No. 12/149,196.

Notice of Allowance issued by the U.S. Patent Office on Jun. 25, 2012 in connection with related U.S. Appl. No. 12/688,400.

Office Action issued by the U.S. Patent Office on Mar. 19, 2012 in connection with related U.S. Appl. No. 12/813,859.

International Search Report and Written Opinion of the International Searching Authority issued on Apr. 25, 2012 in connection with PCT application No. PCT/US2012/021633, which corresponds to related U.S. Appl. No. 13/046,127.

Notice of Allowance issued by the U.S. Patent Office on May 30, 2012 in connection with related U.S. Appl. No. 12/575,612.

Final Office Action issued by the U.S. Patent Office on Jun. 5, 2012 in connection with related U.S. Appl. No. 12/813,859.

International Preliminary Report on Patentability mailed by the International Bureau of WIPO on Oct. 26, 2012, in connection with corresponding PCT application No. PCT/US2011/032489, which corresponds to related U.S. Appl. No. 13/086,819.

Office Action issued by the U.S. Patent Office on Nov. 6, 2012 in connection with related U.S. Appl. No. 12/820,227.

Li, Zhichun, et al. Netshield: Matching with a large vulnerability signature ruleset for high performance network defense. Technical Report NWU-EECS-08-07, Northwestern University, Aug. 2010.

Notice of Allowance issued by the U.S. Patent Office on Jan. 9, 2013 in connection with related U.S. Appl. No. 12/813,859.

Office Action issued by the U.S. Patent Office on Jan. 10, 2013 in connection with related U.S. Appl. No. 12/969,682.

International Preliminary Report on Patentability mailed by the International Bureau of WIPO on Jan. 10, 2013, in connection with corresponding PCT international application No. PCT/US2011/035874, which corresponds to related U.S. Appl. No. 12/820,227.

Office Action issued by the U.S. Patent Office on Feb. 8, 2013 in connection with related U.S. Appl. No. 13/046,127.

U.S. Appl. No. 13/779,851, filed Feb. 28, 2013, Polley et al.

* cited by examiner

| Num | Preprocessor | Layer | Checks | Exits | Microsecs | Avg per Check | Pct of Caller | Pct of Total |
|---|---|---|---|---|---|---|---|---|
| 1 | detect | 0 | 278163 | 278163 | 13674679 | 49.2 | 93.3 | 93 |
| 1 | mpse | 1 | 167104 | 167104 | 2723185 | 16.3 | 19.9 | 19 |
| 2 | rule eval | 1 | 20951320 | 20951320 | 10738281 | 0.5 | 78.5 | 73 |
| 1 | otn eval | 2 | 17144611 | 17144611 | 4223932 | 0.2 | 39.3 | 29 |
| 1 | asn1 | 3 | 19 | 19 | 79 | 4.2 | 0.0 | 0 |
| 2 | pcre | 3 | 875832 | 875832 | 394878 | 0.5 | 9.3 | 3 |
| 3 | uricontent | 3 | 7781 | 7781 | 2241 | 0.3 | 0.1 | 0 |
| 4 | content | 3 | 2158557 | 2158557 | 332127 | 0.2 | 7.9 | 2 |
| 5 | byte_jump | 3 | 16160 | 16160 | 1672 | 0.1 | 0.0 | 0 |
| 6 | byte_test | 3 | 159786 | 159786 | 11104 | 0.1 | 0.3 | 0 |
| 7 | isdataat | 3 | 198 | 198 | 13 | 0.1 | 0.0 | 0 |
| 8 | icode | 3 | 6722 | 6722 | 425 | 0.1 | 0.0 | 0 |
| 9 | dsize_gt | 3 | 63 | 63 | 3 | 0.1 | 0.0 | 0 |
| 10 | ipopts | 3 | 1071 | 1071 | 65 | 0.1 | 0.0 | 0 |
| 11 | flow_from_client | 3 | 16551154 | 16551154 | 991590 | 0.1 | 23.5 | 7 |
| 12 | flags | 3 | 514988 | 514988 | 30304 | 0.1 | 0.7 | 0 |
| 13 | itype | 3 | 3474 | 3474 | 189 | 0.1 | 0.0 | 0 |
| 14 | dsize_eq | 3 | 5520 | 5520 | 290 | 0.1 | 0.0 | 0 |
| 15 | ip_proto | 3 | 115331 | 115331 | 5959 | 0.1 | 0.1 | 0 |
| 16 | flowbits | 3 | 15081248 | 15081248 | 664909 | 0.0 | 15.7 | 5 |
| 17 | dsize_lt | 3 | 2696 | 2696 | 109 | 0.0 | 0.0 | 0 |
| 18 | icmp_id | 3 | 3240 | 3240 | 124 | 0.0 | 0.0 | 0 |
| 19 | fragbits | 3 | 16465 | 16465 | 613 | 0.0 | 0.0 | 0 |
| 20 | flow_from_server | 3 | 126461 | 126461 | 4518 | 0.0 | 0.1 | 0 |
| 21 | ack | 3 | 177 | 177 | 5 | 0.0 | 0.0 | 0 |
| 2 | rtn eval | 2 | 18141224 | 18141224 | 1961966 | 0.1 | 18.3 | 13 |
| 3 | add event q | 2 | 214 | 214 | 22 | 0.1 | 0.0 | 0 |
| 4 | header no match | 2 | 18141224 | 18141224 | 799068 | 0.0 | 7.4 | 5 |
| 5 | set already bit | 2 | 3244561 | 3244561 | 109416 | 0.0 | 1.0 | 1 |
| 6 | check already bit | 2 | 20951320 | 20951320 | 660022 | 0.0 | 6.1 | 5 |
| 7 | no event q | 2 | 18141010 | 18141010 | 570734 | 0.0 | 5.3 | 4 |
| 8 | failed flowbit | 2 | 14896663 | 14896663 | 4658 | 0.0 | 0.0 | 0 |
| 2 | s5 | 0 | 250169 | 250169 | 5597930 | 22.4 | 38.2 | 38 |
| 1 | s5tcp | 1 | 244952 | 244952 | 5578563 | 22.8 | 99.7 | 38 |
| 1 | s5TcpState | 2 | 242008 | 242008 | 5451898 | 22.5 | 97.7 | 37 |
| 1 | s5TcpFlush | 3 | 11956 | 11956 | 21524 | 1.8 | 0.4 | 0 |
| 1 | s5TcpProcessRebuilt | 4 | 11794 | 11794 | 5285037 | 448.1 | 24554.1 | 36 |
| 2 | s5TcpBuildPacket | 4 | 11844 | 11844 | 7810 | 0.7 | 36.3 | 0 |
| 2 | s5TcpData | 3 | 174922 | 174922 | 61917 | 0.4 | 1.1 | 0 |
| 1 | s5TcpPktInsert | 4 | 68867 | 68867 | 46609 | 0.7 | 75.3 | 0 |
| 2 | s5TcpNewSess | 2 | 1312 | 1312 | 3589 | 2.7 | 0.1 | 0 |
| 3 | frag3 | 0 | 152 | 152 | 1546 | 10.2 | 0.0 | 0 |
| 1 | frag3rebuild | 1 | 31 | 31 | 32 | 1.1 | 2.1 | 0 |
| 2 | frag3insert | 1 | 109 | 109 | 106 | 1.0 | 6.9 | 0 |
| 4 | smtp | 0 | 1736 | 1736 | 7811 | 4.5 | 0.1 | 0 |
| 5 | ftptelnet_telnet | 0 | 162 | 162 | 182 | 1.1 | 0.0 | 0 |
| 6 | dcerpc | 0 | 7347 | 7347 | 4532 | 0.6 | 0.0 | 0 |
| 7 | decode | 0 | 267183 | 267183 | 116521 | 0.4 | 0.8 | 1 |
| 8 | httpinspect | 0 | 144328 | 144328 | 62017 | 0.4 | 0.4 | 0 |
| 9 | backorifice | 0 | 3875 | 3875 | 956 | 0.2 | 0.0 | 0 |
| 10 | sfportscan | 0 | 223835 | 223835 | 50598 | 0.2 | 0.3 | 0 |
| 11 | dns | 0 | 997 | 997 | 148 | 0.1 | 0.0 | 0 |
| 12 | eventq | 0 | 545421 | 545421 | 38076 | 0.1 | 0.3 | 0 |
| total | total | 0 | 266798 | 266798 | 14664298 | 55.0 | 0.0 | 0 |

| Num | Preprocessor | Layer | Checks | Exits | Microsecs | Avg per Check | Pct of Caller | Pct of Total |
|---|---|---|---|---|---|---|---|---|
| 1 | frag3 | 0 | 152 | 152 | 1361 | 9.0 | 0.0 | 0 |
| 1 | frag3rebuild | 1 | 31 | 31 | 30 | 1.0 | 2.3 | 0 |
| 2 | frag3insert | 1 | 109 | 109 | 87 | 0.8 | 6.4 | 0 |
| 2 | detect | 0 | 278163 | 278163 | 1911843 | 6.9 | 64.9 | 65 |
| 1 | mpse | 1 | 167259 | 167259 | 782300 | 4.7 | 40.9 | 27 |
| 2 | rule eval | 1 | 1197904 | 1197904 | 886512 | 0.7 | 46.4 | 30 |
| 1 | rule tree eval | 2 | 1197904 | 1197904 | 782183 | 0.7 | 88.2 | 27 |
| 1 | asn1 | 3 | 19 | 19 | 74 | 3.9 | 0.0 | 0 |
| 2 | pcre | 3 | 286137 | 286137 | 131384 | 0.5 | 16.8 | 4 |
| 3 | uricontent | 3 | 4585 | 4585 | 1484 | 0.3 | 0.2 | 0 |
| 4 | content | 3 | 684907 | 684907 | 114110 | 0.2 | 14.6 | 4 |
| 5 | byte_jump | 3 | 8090 | 8090 | 765 | 0.1 | 0.1 | 0 |
| 6 | byte_test | 3 | 91342 | 91342 | 6079 | 0.1 | 0.8 | 0 |
| 7 | isdataat | 3 | 198 | 198 | 12 | 0.1 | 0.0 | 0 |
| 8 | flowbits | 3 | 1416831 | 1416831 | 69986 | 0.0 | 8.9 | 2 |
| 9 | flow | 3 | 843648 | 843648 | 36533 | 0.0 | 4.7 | 1 |
| 10 | ipopts | 3 | 1055 | 1055 | 44 | 0.0 | 0.0 | 0 |
| 11 | flags | 3 | 249919 | 249919 | 9705 | 0.0 | 1.2 | 0 |
| 12 | ack | 3 | 85 | 85 | 3 | 0.0 | 0.0 | 0 |
| 13 | icmp_id | 3 | 3192 | 3192 | 113 | 0.0 | 0.0 | 0 |
| 14 | itype | 3 | 3421 | 3421 | 119 | 0.0 | 0.0 | 0 |
| 15 | icode | 3 | 5563 | 5563 | 191 | 0.0 | 0.0 | 0 |
| 16 | ip_proto | 3 | 98752 | 98752 | 3333 | 0.0 | 0.4 | 0 |
| 17 | fragbits | 3 | 16446 | 16446 | 526 | 0.0 | 0.1 | 0 |
| 2 | rtn eval | 2 | 17213 | 17213 | 3202 | 0.2 | 0.4 | 0 |
| 3 | smtp | 0 | 1736 | 1736 | 8334 | 4.8 | 0.3 | 0 |
| 4 | s5 | 0 | 250169 | 250169 | 723970 | 2.9 | 24.6 | 25 |
| 1 | s5tcp | 1 | 244952 | 244952 | 704097 | 2.9 | 97.3 | 24 |
| 1 | s5TcpState | 2 | 242008 | 242008 | 576456 | 2.4 | 81.9 | 20 |
| 1 | s5TcpFlush | 3 | 11956 | 11956 | 15962 | 1.3 | 2.8 | 1 |
| 1 | s5TcpProcessRebuilt | 4 | 11794 | 11794 | 395852 | 33.6 | 2479.9 | 13 |
| 2 | s5TcpBuildPacket | 4 | 11844 | 11844 | 5941 | 0.5 | 37.2 | 0 |
| 2 | s5TcpData | 3 | 174922 | 174922 | 54273 | 0.3 | 9.4 | 2 |
| 1 | s5TcpPktInsert | 4 | 68867 | 68867 | 40623 | 0.6 | 74.8 | 1 |
| 2 | s5TcpNewSess | 2 | 1312 | 1312 | 2339 | 1.8 | 0.3 | 0 |
| 5 | ftptelnet_telnet | 0 | 162 | 162 | 129 | 0.8 | 0.0 | 0 |
| 6 | dcerpc | 0 | 7347 | 7347 | 3694 | 0.5 | 0.1 | 0 |
| 7 | decode | 0 | 267183 | 267183 | 119867 | 0.4 | 4.1 | 4 |
| 8 | httpinspect | 0 | 144328 | 144328 | 62053 | 0.4 | 2.1 | 2 |
| 9 | sfportscan | 0 | 223835 | 223835 | 46869 | 0.2 | 1.6 | 2 |
| 10 | backorifice | 0 | 3875 | 3875 | 596 | 0.2 | 0.0 | 0 |
| 11 | dns | 0 | 997 | 997 | 79 | 0.1 | 0.0 | 0 |
| 12 | eventq | 0 | 545421 | 545421 | 41669 | 0.1 | 1.4 | 1 |
| total | total | 0 | 266798 | 266798 | 2946089 | 11.0 | 0.0 | 0 |

SPEED AND MEMORY OPTIMIZATION OF INTRUSION DETECTION SYSTEM (IDS) AND INTRUSION PREVENTION SYSTEM (IPS) RULE PROCESSING

CROSS-REFERENCE TO RELATED APPLICATIONS

This application claims the benefit of U.S. Provisional Application No. 61/071,200, filed Apr. 17, 2008, which is expressly incorporated herein by reference.

TECHNICAL FIELD

The technical field relates in general to computer network security, and more specifically to processing of rules for intrusion detection and/or prevention.

BACKGROUND

An intrusion detection system (IDS) or intrusion protection system (IPS) monitors network or host traffic looking for anomalies, intrusive activity or misuse. One method of detection is rule-based. For this method, the IDS/IPS compares network traffic to individual rules in a database of rules that define known attack styles (also referred to as signatures), vulnerabilities, and the like. When the IDS/IPS finds a match in the network traffic to a "signature" in its database of rules, it can take any designated action.

SNORT® is an example of a network intrusion prevention and detection system, and utilizes a rule-driven language based on known attack signatures. SNORT uses a state machine and fast pattern matcher to check whether information in network traffic match certain patterns. When a pattern end-state matches, each rule in a set of rules relevant to the matched pattern is applied to the network traffic. When SNORT detects an attack based on one of the rules, it performs the action designated in the rule.

The number of possible attacks, and hence the number of rules or signatures are increasing exponentially. Consequently, the amount of space for storing rules, and the amount of time for processing rules, is increasing enormously and threatens to become unmanageable.

SUMMARY

An IDS/IPS rule contains a series of detection options, some of which may be the same as used in other IDS/IPS rules. Because of the potential size of the rule set and the number of rule options, a fast, efficient method and system is desired in order to speed network application processing times to reduce latency and increase throughput.

Therefore, one or more embodiments provide systems, computer readable mediums, and methods performed in an intrusion detection/prevention system in a computer system. Network traffic is received. The network traffic is checked for a matching pattern. Upon identifying the matching pattern in the network traffic, the network traffic with the matching pattern is evaluated against rules specific to the matching pattern, wherein the rules specific to the matching pattern are represented by a rule tree, wherein references to rule options are represented in the rule tree and the rule options are stored separately from the rule tree. The rule tree represents each unique rule by each unique path from a root of the tree to each of the leaf nodes, and the rule tree represents a rule option as a non-leaf node of the rule tree. The evaluating of the network traffic includes processing, against the network traffic, the rule options in the rule tree beginning at the root of the rule tree. Processing of all of the rules represented by the subtrees of nodes with rule options that do not match are eliminated. The network traffic is evaluated against rules terminating in leaf nodes only for combinations of rule options which match the network traffic.

According to various embodiments, if a rule option in a node of the rule tree does not match the network traffic, then the options in the subtree of the node with the rule option that does not match are not evaluated. For the rule options which match the network traffic, then rule options in the subtree of the nodes with the rule options that match the network traffic are processed, and an event is added for the rule if the rule represented by one of the leaf nodes matches the traffic.

According to another embodiment, the root of the tree begins all rules that include the same rule option of the root, a branch in the tree is where a rule option of the rules diverges, and the rule options beyond the divergence are stored as a linear subtree after the point of divergence.

Another embodiments includes receiving a rule, checking whether the rule options in the rule are new and unique, and if new and unique, then inserting the rule option into the tree where the path of the rule diverges from existing rules in the rule tree. Optionally, the inserting of the rule option into the tree includes creating a rule option reference to the rule option, storing the rule option reference in a hash table, and inserting the rule option reference into the tree at a branch point where the rule options in the rule diverge from previous rule options in the rule tree.

According to other embodiments, the rule options are stored separately in a rule option storage, and the references to the rule options in the nodes of the rule tree are references into a hash table of the rule option storage.

According to still another embodiments, the rules and the rule options are prepared in accordance with SNORT™ rule structure.

The computer system for evaluating network traffic against rules in connection with an intrusion detection/prevention system can include a transceiver operable to receive or transmit network traffic; and a processor cooperatively operable with the memory and the transceiver. The processor can be configured to facilitate the foregoing.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

BRIEF DESCRIPTION OF THE DRAWINGS

The accompanying figures, where like reference numerals refer to identical or functionally similar elements and which together with the detailed description below are incorporated in and form part of the specification, serve to further illustrate various exemplary embodiments and to explain various principles and advantages in accordance with the embodiments.

FIG. 5 is a copy of an actual performance table printout for a conventional IDS/IPS not using the rule tree;

FIG. 6 is a copy of an actual performance table printout for an IDS/IPS using the rule tree;

DETAILED DESCRIPTION

Figure 1:
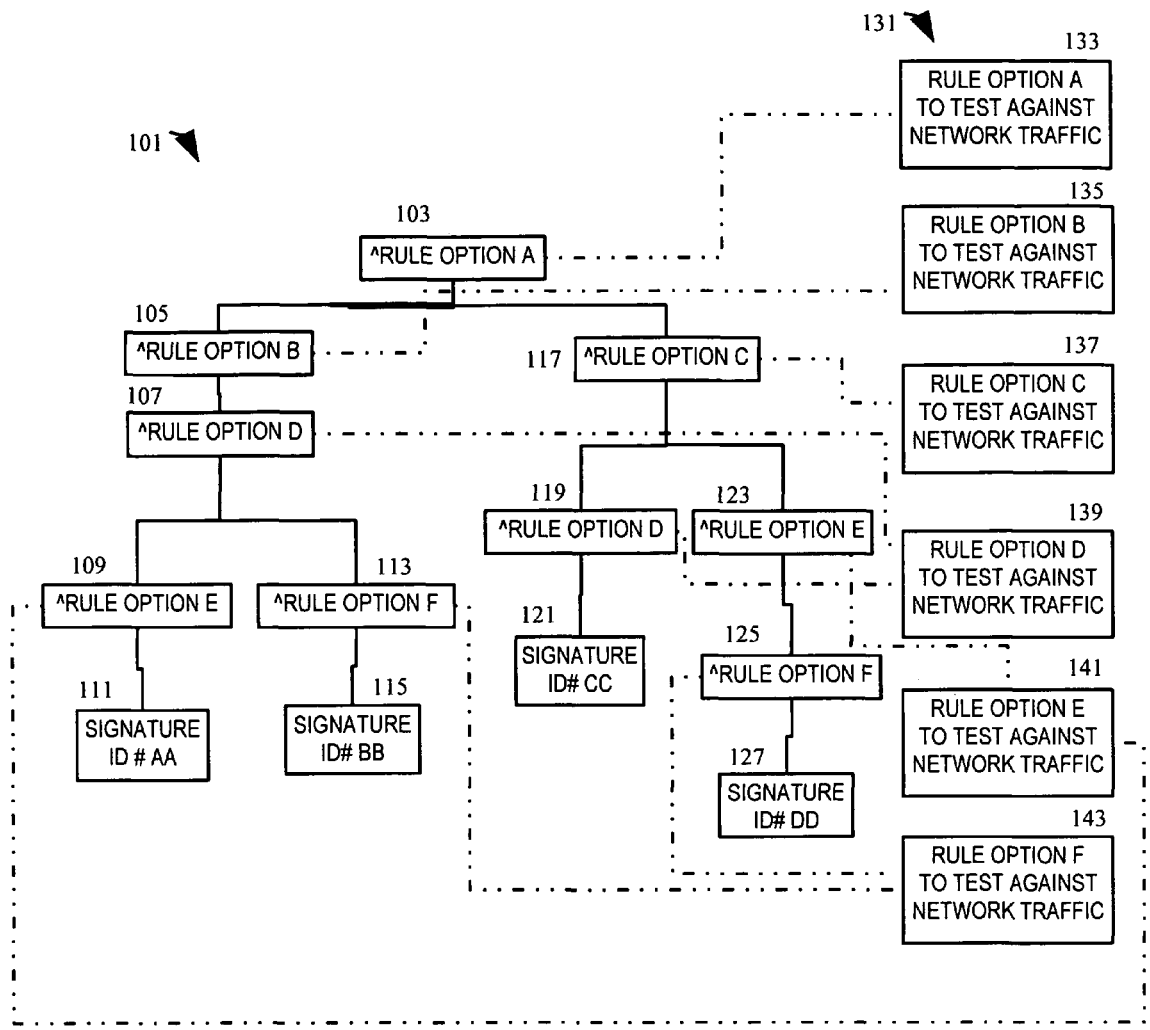
FIG. 1 is a block diagram illustrating a rule tree and rule options.

In overview, the present disclosure concerns analysis of network traffic on networks, often referred to as packet switching networks, which support communication from wireless and/or wire line devices to a destination. Communications on such networks may be analyzed for intrusion detection/prevention, for example according to various rules. More particularly, various inventive concepts and principles are embodied in systems, devices, and methods therein for providing speed and memory optimization for rule processing in intrusion detection/prevention systems.

The instant disclosure is provided to further explain in an enabling fashion the best modes of performing one or more embodiments. The disclosure is further offered to enhance an understanding and appreciation for the inventive principles and advantages thereof, rather than to limit in any manner the invention. The invention is defined solely by the appended claims including any amendments made during the pendency of this application and all equivalents of those claims as issued.

Relational terms such as first and second, and the like, if any, are used herein solely to distinguish one from another entity, item, or action without necessarily requiring or implying any actual such relationship or order between such entities, items or actions. Some embodiments may include a plurality of processes or steps, which can be performed in any order, unless expressly and necessarily limited to a particular order; i.e., processes or steps that are not so limited may be performed in any order.

Much of the inventive functionality and many of the inventive principles when implemented, are best supported with or in software or integrated circuits (ICs), such as a digital signal processor and software therefore, and/or application specific ICs. It is expected that one of ordinary skill, notwithstanding possibly significant effort and many design choices motivated by, for example, available time, current technology, and economic considerations, when guided by the concepts and principles disclosed herein will be readily capable of generating such software instructions or ICs with minimal experimentation. Therefore, in the interest of brevity and minimization of any risk of obscuring the principles and concepts, further discussion of such software and ICs, if any, will be limited to the essentials with respect to the principles and concepts used by the exemplary embodiments.

As further discussed herein below, various inventive principles and combinations thereof are advantageously employed to provide speed and memory optimization for rule processing in an intrusion detection system (IDS) and/or an intrusion prevention system (IPS). Additional rules and rule options can be readily added. Furthermore, the IDS/IPS can operate at network speed, without increasing network latency or throughput, for example when rules are added.

The following discussion assumes that the reader has familiarity with a SNORT detection engine (e.g., SNORT 2.8.1 and earlier), the concepts of a fast pattern matcher, and rule/port groups. Briefly, a port group generically encompasses a collection of rules and the corresponding pattern matcher that will be used to detect attacks. The examples provided herein can be extrapolated to other rule based IDS/IPS.

The current design of the rule-based SNORT fast pattern matcher can result in two performance problems. The first is the repeated examination of the same rule option because of a large number of similar rules for a given pattern matcher end-state. The second is a swapping out of the CPU (central processing unit) cache of the pattern matcher, and swapping into the CPU cache of each of the rules for evaluation; when the rules are finished being evaluated, the pattern must be swapped back into the CPU cache. Each of these is discussed in more detail below.

First, as SNORT rules have migrated from being handwritten to being auto-generated via a script, there has been a significant negative impact on performance because of the sheer number of rules that are checking almost the exact same pieces of data.

For a given port group, large numbers of rules are being evaluated in certain pattern matcher end-states. When the current SNORT fast pattern matcher finds a matching pattern, all of those rules for the end-state are tested as part of a list. For example, there are a large number of rules that have "|FF|SMB" as their longest pattern. After a thorough analysis of the current SNORT rules, the inventors determined that in many cases, often the first two, three or four (and sometimes more) options from many of the rules in that list are similar or even the same. One case demonstrated that a large number of rules all have a rule option flow, with parameters of established and to-server, followed by a rule option flowbit, with parameters that result in a check of the same unique bit.

When the pattern matcher reaches the end-state, each one of those rules is checked for a match. Each one may pass the flow option, but may fail on the flowbit check. The same tests for those two options are repeated by the current SNORT system for every rule in that list for the pattern matcher end-state. If the flowbit check passes, the same two options are being checked for every rule in the list as well.

Second, as larger numbers of rules have been added to the SNORT rule set, keeping the SNORT multi-pattern matcher state tables in the CPU cache is less likely. When the pattern matcher reaches an end-state, as the rules for that end-state are evaluated, the detection options for those rules are moved into the CPU cache, and the pattern matcher is swapped out. Once all of the rules for the end-state are evaluated, the pattern matcher state tables are swapped back into the CPU cache to pick up at the next byte for evaluation.

This process repeats for each matching end-state to correctly evaluate all of the possible rules that match data in the packet, resulting in a series of CPU cache swaps. Constantly swapping the pattern matcher in and out of CPU cache is detrimental to performance.

Further in accordance with exemplary embodiments, there can be provided a method and/or system for handling IDS/IPS rules where many of the rules have a common beginning. The IDS/IPS can eliminate large groups of rules from having to be evaluated and thus can operate more efficiently than a conventional IDS/IPS in connection with, e.g., high speed networks. Accordingly, the IDS/IPS can provide better scaling of performance as rules are added to the rule set, in effect providing less degenerate performance which is independent of rules and CPU cache sizes.

Because of the large redundancy of rule options, a new means to store the rule options was devised, so that at parse time, each option is checked for uniqueness. Data is only stored for each unique option (option type plus all parameters to the option determine its uniqueness). If a rule that is parsed later uses the same option data for a give option, the new rule simply references the option data from the original option, instead of allocating memory to store its own option data. This reduces the memory footprint used by SNORT rule options. Once each of the unique rule options are identified, for each port group's pattern matcher end-states, a tree of rule options is created from the simple list of rules that were tied to that end-state. The tree consists of nodes, where each node has an option type, a reference to the unique option data (obtained from parsing that option), and references to one or more children. Leaf nodes in the tree contain the signature information for a single rule, such that the path from the root of the tree to a given leaf node represents the rule options for that entire rule. A node that has more than one child identifies a point at which a diversion occurs between two rules set of options. The options prior to and including that node for the rules represented by the tree to that point are the same, while the nodes after are different. The root of each tree may have one or more children, with each child representing a different first option for all of the rules in that end-state.

Figure 2:
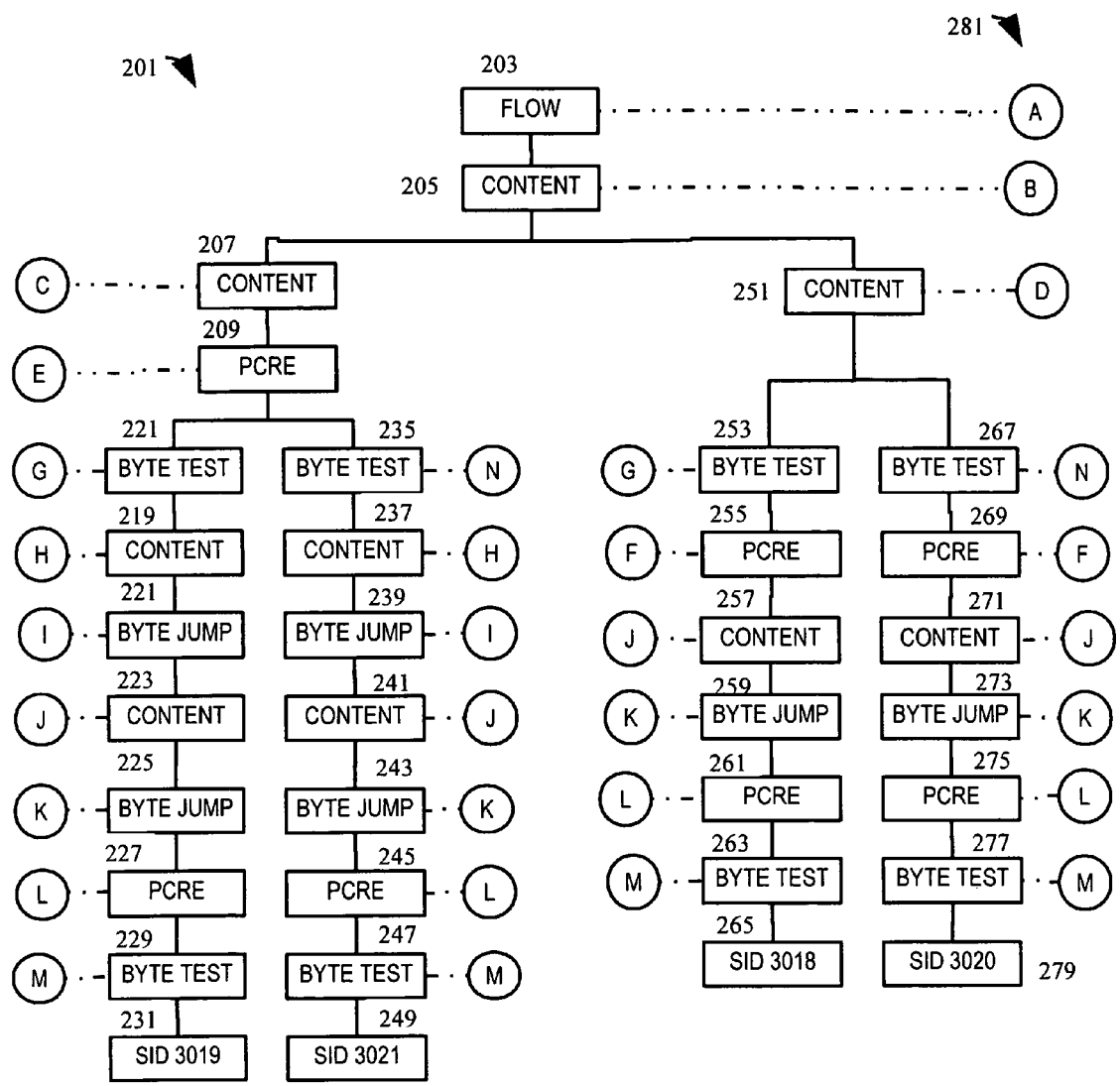
FIG. 2 is a block diagram illustrating a representative example of a rule tree.
Figure 3:
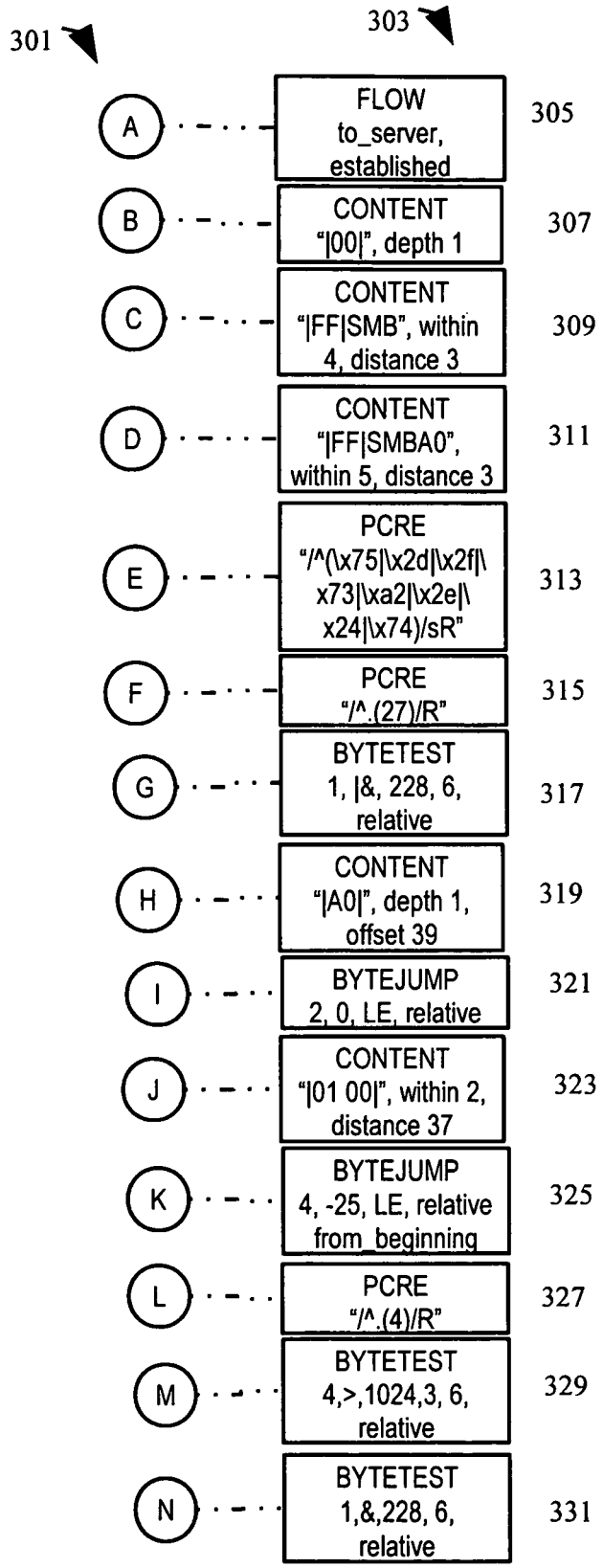
FIG. 3 is a block diagram illustrating rule options for the rule tree of FIG. 2.

Reference is now made to FIG. 2 illustrating a rule tree, together with FIG. 3 illustrating the rules corresponding to the rule tree. Note the use of connector symbols A-N 281, 301 merely for illustration purposes which graphically connect FIG. 2 and FIG. 3.

Referring now to FIG. 2, a block diagram illustrating a representative example of a rule tree will be discussed and described. FIG. 2 shows an example detection option tree 201 (also referred to as a rule tree) with four rules corresponding to signature identifications (SIDs) 3018, 3019, 3020, and 3021. The data for each unique option is shown in FIG. 3, while the nodes in the tree are shown in FIG. 2. The first option for each of these rules is flow:to_server,established, and that is always followed by content:"|00|". After the first two options, the rules diverge.

In conventional systems, rules were being processed in a linear fashion. That is, once a pattern matched in network traffic, each of the rules for that pattern match in that state were processed individually.

The inventors observed that the first several rule options are the same in the rules, and the subsequent rule options in each rule are divergent. Conventionally, a single rule is stored as a linked list of rule options, each rule option being represented separately, even if the rule options are not unique and appear in multiple rules.

Referring back to FIG. 1, a block diagram illustrating a rule tree 101 and representative rule options 131 will be discussed and described. FIG. 1 is a simplified version where there are four unique rules represented: AA, BB, CC and DD. The following are the rules in this illustration, and their corresponding rule options:

AA: Rule option A, rule option B, rule option D, rule option E.

BB: Rule option A, rule option B, rule option D, rule option F.

CC: Rule option A, rule option C, rule option D.

DD: Rule option A, rule option C, rule option E, rule option F.

FIG. 1 illustrates that the rule tree 101 includes a root node 103, leaf nodes 111, 115, 121, 127, and non-leaf nodes (including the root node) 103, 105, 107, 109, 113, 117, 119, 123, 125. The rule options 131 include individual rule options 133, 135, 137, 139, 141, 143. The non-leaf nodes of the rule tree include references to the individual rule options 133, 135, 137, 139, 141, 143, which are stored separately from the rule tree 101. Each of the leaf nodes 111, 115, 121, 127 includes one of the signature identification numbers AA, BB, CC and DD each corresponding to a unique rule.

The optimization of rule processing intends to perform each rule option in initially overlapping rules only once, until the point where the rule options in a set of rules diverge. Thus, the path through the rule tree 101 to evaluate a single unique rule from start to finish is the same as the conventional linear path, although in contrast to the conventional linear path, paths with overlapping processing are shared from a root node 103 to a point of divergence (such as the branching from node 103 to nodes 105 and 117. A root 103 of a rule tree 101 includes the commands that have the root commonality, and an evaluation from root node to a leaf node 111, 115, 121, 127 of the rule tree constitutes evaluation of a single unique rule. Hence, an evaluation from root node 103 for example to leaf node 111, evaluating the unique rule AA, includes each of the rule options A, B, D and E.

When evaluating a given pattern matcher end-state, the detection engine can evaluate the tree 101 in a depth first manner. If a rule option in a node matches the network traffic, its children are then checked, and so on. If a node fails to match, the information of time of evaluation is cached. If a non-relative node is checked again, a quick determination can be made as to its matching or not.

The following briefly describes relativity of two nodes in the tree. (1) Rule options A and B are relative if the evaluation of option B and its matching criteria depends on state data at the end of evaluation option A. For example, a byte check that is checking for a specific value that is relative to the end of a content pattern is considered a relative rule option, as it depends on where the end of the content pattern occurs. (2) Non-relative rule options C and D are independent. If a non-relative option C in rule X does not match a given packet, the same non-relative C option in rule Y will also not match. For example, a rule specifies two content options that can appear anywhere in the packet payload. Those two content options are non-relative rule options.

When the evaluation reaches a leaf node, the rule represented by that leaf node has fully matched, and an event for that rule can be added to SNORT's event queue or other appropriate action, e.g., specified by the fully matched rule, can be taken.

FIG. 2 is a particular example of a rule tree 201 includes a root node 203, leaf nodes 231, 249, 265, 279, and non-leaf nodes (including the root node) 203-229, 235-247, 251-263, 267-277. FIG. 3 shows rule options 303 for FIG. 2, including a FLOW rule option 305, CONTENT rule options 307, 309, 311, 319, 323, PCRE (PERL compatible regular expression) rule options 313, 315, 327, BYTETEST rule options 317, 329, 331, and BYTEJUMP rule options 321, 325. The illustrated rule options are formatted according to SNORT rule format. Each of the non-leaf nodes of the rule tree 201 can include a reference to one of the rule options 305-331, which can be stored separately from the rule tree 201. Each of the leaf nodes 231, 249, 265, 279 includes one of the signature identification numbers SID 3018, SID 3019, SID 3020, SID 3021 corresponding to a unique rule.

The advantage of evaluating rules in a rule tree such as this is that for a given group of rules that have the same set of initial rule options, those rule options are only evaluated once for a given pattern matcher end-state, rather than once for each rule in the group. Referring back to the example rules in FIG. 2 and FIG. 3, if either the flow rule option 203 or first content rule options 205, 207, 251 do not match, those options are evaluated only once for the entire set of four rules.

Non-content rules can be added to a non-content tree for each port group, and that tree can be evaluated in a similar fashion. Effectively, non-content rules are a special case pattern matcher end-state that is always evaluated. These rules can be evaluated in the tree format, rather than iterating through the list of all non-content rules for the port group.

In the worst case, the evaluation time for the detection option rule tree is the same as the list of rules for a given pattern matcher end-state, because the tree becomes a list of rules with differing initial rule options. In the more general cases, and especially with certain classes of rules such as Netbios/SMB rules, the evaluation time is reduced both for the rules that match, and the rules that do not.

Figure 4:
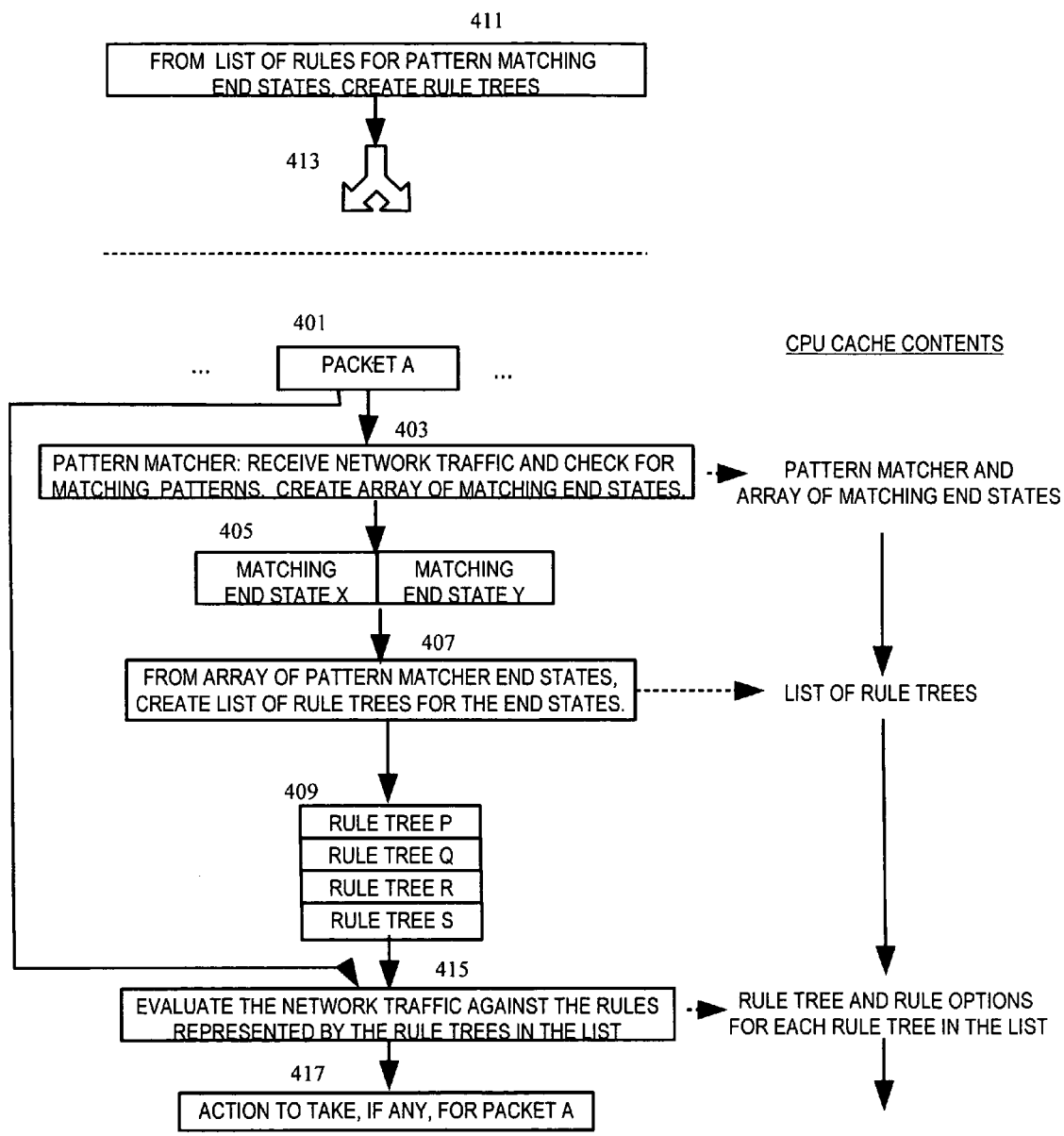
FIG. 4 is a flow diagram illustrating processing of an IDS/IPS.

Referring now to FIG. 4, a flow diagram illustrating processing of an IDS/IPS will be discussed and described. In overview, a pattern matching engine including end-states from the patterns for the port group is created, for each group of rules, and rule tree(s) 413 are created 411 from a list of rules, for each pattern matching end state, during initialization. Then, during run-time, a packet A 401 is processed in an IDS/IPS by a pattern matcher 403 which creates an array of matching endstates 405; the array of matching end states is processed to create a list of rule trees 409 that correspond to the endstates; the packet A is evaluated 415 against the rules represented by the rule trees in the list; and the IDS/IPS generates the action to take (e.g., alerts), if any, for packet A depending on the rules which matched packet A.

An additional performance gain for the pattern matcher 403 is to keep it in the CPU cache, so that the cache has consistency. The pattern matcher can be kept in the cache by adding each matching end-state to a queue (implemented as a simple array 405), rather than processing the rules for that end-state when it is reached. If an end-state is reached that is already in the queue, it is skipped and the pattern matcher 403 continues.

After the pattern matcher 403 has completed a full pass over the data in the packet 401, any end states that are queued are processed 407.

If during the pattern match process, the array 405 becomes full, each of the end-states that are queued is processed in the order in which they were queued. Once all of the queued endstates are processed, the array size is reset to 0. The pattern matcher 403 then resumes where it left off when the array became full.

Using a static array 405 of fixed size means no expensive memory allocation or cleanup is necessary.

This change from processing rules when the end-state is reached to processing them from a queue may result in different alerts being generated. The events that may be different relate to rules that were processed in an early end-state, but failed a flowbit check, then were processed again in a later end-state after that flowbit was set as a result of rules processed during an intermediate end-state. These rules are using flowbits to arbitrarily correlate events within a single packet evaluation. This is contrary to the design of flowbits, which were to be used to correlate events across multiple packets, and is not reliable. In development testing with live traffic and a full rule set, these cases were nonexistent.

With regard to the rule option detection tree, the following describes parsing of individual rule options, creating the rule option tree, and processing a pattern matcher end-state rule option tree. Each of these is discussed in more detail below.

Parse Individual Rule Options: When adding a reference to data specific to a given option, check it for uniqueness.

(Uniqueness checks are made by a hashing function that generates a 32 bit value based on the option type and all of the option data for that option type. If a hash collision (a match) occurs, the specific values for each element of the option data are verified to be exactly the same before declaring an option as already existing.)

1) If found to be unique, add a reference to it to the list of all rule options.

2) If found to already exist, use the reference to the existing option specific data and free the newly parsed option specific data structure.

Create 411 the rule option tree 413:

1) For each end-state in the pattern matcher that is a match state, traverse the list of rules for that end state. Start with the first option in the rule.

a. Check if the reference to the option specific data is the same as any of the nodes at the current level in the tree.

b. If the same, go to the next option in the list and down a level from the current node in the tree.

c. If not the same, create a child node from the current node, set its option specific data and go to the next option in the list. If the rule option is relative, mark the child as being relative.

d. Repeat this process until reaching the end option in the current rule, and add the signature information for the rule as the option specific data for the leaf node.

2) Continue with the next rule in the list

Process 415 a pattern matcher end-state rule option tree:

1) Repeat for each child from the root of the tree.

a. Check if the node is not relative, if so and the last evaluation time is the same as the current packet, and the previous evaluation flags match (i.e. reassembled IP fragments or TCP stream), return the cached result from the previous evaluation of the node.

b. Otherwise, evaluate the node, based on the option type.

1. If option type is leaf node, and a "no alert" flag is not set, add an event to the queue for the option specific data in the leaf node. Increment the match count for this node.

2. If option type is non-URI (uniform resource identifier) content, cache the pattern match data (offset, depth, distance, within, etc). Evaluate the pattern. If it matches, save the pointer to the next byte after the matched content. If the pointer is the same from the previous content search, this is a duplicate and set the no match flag.

3. If option type is PCRE, cache the PCRE data (relativity, last found offset). Evaluate the expression. If it matches, save the pointer to the next byte after the matched content.

4. Other option types, evaluate the option.

c. If the option did not match, cache the match count result, and return it.

d. If the option failed because of a flowbit, mark this node as a flowbit failure, cache the match count result, and return 0.

e. If the option passed, but indicates no alert (from flowbits: noalert option), set a "no alert" flag.

f. If the option passed, recursively check each of its children and increment the match count result for this node by the number of matches from the children.

g. If the option type is content or PCRE, it matched, and it has child nodes that are relative, evaluate the node again (from step b above) at the end of the current match.

1. For content, start at the saved pointer from the previous content match for this node, and adjust the offset, depth, distance, and within parameters based on the previous start point and new pointer.

2. For PCRE, start at the pointer from the previous PCRE result.

h. Return the match count from this node plus any of its children.

2) Return the number of matches from all nodes in the tree.

The following describes actions to take with respect to pattern matcher CPU caching.

When a pattern matcher end-state is reached, add a reference to the match data (rule option tree and list of rules) for the end-state into a queue (implemented as an array) and increment the number of entries in the queue. Prior to insertion, iterate through the current entries to ensure uniqueness for the end-state match data.

If the array reaches a maximum number of entries, process each of the queued end-states and reset the number of entries in the queue to 0.

Upon completion of the pattern matcher 403 (inspected all bytes of the payload), if the number of entries in the queue is >0, process 407 each of the queued end-states.

Referring now to FIG. 5 and FIG. 6, a copy of an actual performance table printout for a conventional IDS/IPS not using the rule tree (FIG. 5) will be compared to a copy of an actual performance table printout for an IDS/IPS using the rule tree (FIG. 6).

A preliminary test was conducted to compare performance of SNORT 2.8.1 with conventional rules with performance of SNORT 2.8.1 using the rule option detection tree described herein. A comparison of the performance tables (FIG. 5 illustrates "Performance of SNORT 2.8.1 with conventional rules" and FIG. 6 illustrates "Performance of SNORT 2.8.1 with the rule tree") show with the proof of concept rule trees, both a dramatic reduction in the number of rule evaluations, repeated checks for flow and flowbits, as well as a significant reduction in overall processing time per packet. The tests were run with the same configuration (same preprocessor configurations and set of rules enabled), using a large PCAP (packet capture) (of 500 Mbytes containing over 250000 packets over the course of 20 seconds). SMB (server message block)/Netbios (network basic input/output system) rules were enabled for these tests.

Additional results have been obtained using other PCAPs and the same rules. Further testing without the SMB/Netbios rules enabled still yields a reduction in per packet processing time, with the average time per packet dropping from 12 usec to 8 usec, demonstrating that the rule option tree is beneficial both with large and small rule sets. These results indicate that the impact of the larger rule sets that include SMB/Netbios rules is not as dramatic when using the rule option tree.

Preliminary testing on test networks demonstrated similar results with the default configuration. The addition of the rule tree yielded the first time on those test networks where SNORT has consistently been showing low levels of packet drops when rules are enabled. Over the course of a twelve hour test, throughput was consistently improved, going from around 200 MB (megabytes)/s to at or above 500 MB/s. Drop percentage during this test also improved, from a range of 70% to 90%, and average of 80% to 0% to 15%, with the average less than 5%.

Proof of concept testing for the pattern matching CPU caching shows that separating the MPSE (multi-pattern search engine) pattern matching and rule processing into 2 separate phases improves the speed of the MPSE processing. The amount of speed up varies from 0% to 60% depending on the algorithm, the rules in use, and the pcap file. Ultimately this strategy helps reduce the degradation from the highest level of performance for all algorithms, and brings them all much closer together in total packet processing time.

AC (Aho Corasick) remains the clear performance leader, in pure pattern matching; however total packet processing time appears affected by its memory usage. AC-BNFA (backtracking nondeterministic finite automaton) and Lowmem appear to have very close total packet processing times. Lowmem achieves some of the best improvements, and with some pcaps out performs AC-BNFA. That better performance is entirely data driven, as Lowmem also achieves the worst results on CAW test data. The unique queue insertions reduced duplicate rule tests and accounts for much of the time improvements overall.

A series of five tests were run to validate the pattern matching queue behaviour:

Test 1. CAW Generated Traffic w/Large Rule set (includes Netbios Rules)

Test 2. Allpcaps3 PCAP w/Large Rule set (includes Netbios Rules)

Test 3. Defcon CD PCAP w/Large Rule set (includes Netbios Rules)

Test 4. Large PCAP w/Large Rule set (includes Netbios Rules)

Test 5. Large PCAP w/Small Rule set (no Netbios Rules)

The tables below highlight the results from each of those tests, with MPSE=multi pattern search engine and average packet time in instructions, showing that the queue approach on average:

AC-Q (AC with queue insertion) is 30% faster than native AC

AC-BNFA-Q (AC-BNFA with queue insertion) is 10% faster than native AC-BNFA

LOWMEM-Q (LOWMEM with queue insertion) is 30% faster than native LOWMEM

TABLE 1

| Test 1: | | | | | | |
|---|---|---|---|---|---|---|
| Test 1 | AC | AC-Q | AC-BNFA | AC-BNFA-Q | LOWMEM | LOWMEM-Q |
| MPSE | 2.9 | 2.5 | 4.0 | 4.0 | 5.8 | 5.8 |
| Avg Pkt Time | 11.9 | 10.2 | 12.6 | 12.2 | 16.5 | 13.6 |

TABLE 2

| Test 2: | | | | | | |
|---|---|---|---|---|---|---|
| Test 2 | AC | AC-Q | AC-BNFA | AC-BNFA-Q | LOWMEM | LOWMEM-Q |
| MPSE | 8.2 | 3.5 | 5.9 | 5.3 | 11.5 | 6.7 |
| Avg Pkt Time | 13.0 | 6.9 | 8.1 | 7.1 | 13.1 | 8.1 |

TABLE 3

Test 3:

| Test 3 | AC | AC-Q | AC-BNFA | AC-BNFA-Q | LOWMEM | LOWMEM-Q |
|---|---|---|---|---|---|---|
| MPSE | 6.5 | 3.9 | 6.2 | 5.9 | 8.8 | 4.9 |
| Avg Pkt Time | 9.0 | 6.1 | 7.1 | 6.9 | 10.3 | 6.5 |

TABLE 4

Test 4:

| Test 4 | AC | AC-Q | AC-BNFA | AC-BNFA-Q | LOWMEM | LOWMEM-Q |
|---|---|---|---|---|---|---|
| MPSE | 13.2 | 9.6 | 14 | 11.1 | 14.1 | 9.5 |
| Avg Pkt Time | 58.5 | 53.4 | 58.3 | 54.8 | 63.4 | 54.4 |

TABLE 1

Test 5:

| Test 5 | AC | AC-Q | AC-BNFA | AC-BNFA-Q | LOWMEM | LOWMEM-Q |
|---|---|---|---|---|---|---|
| MPSE | 4.3 | 3.0 | 5.2 | 4.5 | 5.4 | 3.5 |
| Avg Pkt Time | 10.5 | 8.1 | 10.5 | 9.1 | 11.3 | 8.5 |

AC-BNFA was previously modified (in a prior version of SNORT, SNORT 2.8.0) to queue the last state tested, which accounts for most of the duplicate testing. Because of this, AC-BNFA shows the least improvement from the caching changes, as it was already using a simple form of caching.

In summary, the combination of both the rule option tree and improved caching performance for the pattern matching engine provide a much needed performance boost to SNORT both in controlled test environments as well as live traffic environments.

Figure 7:
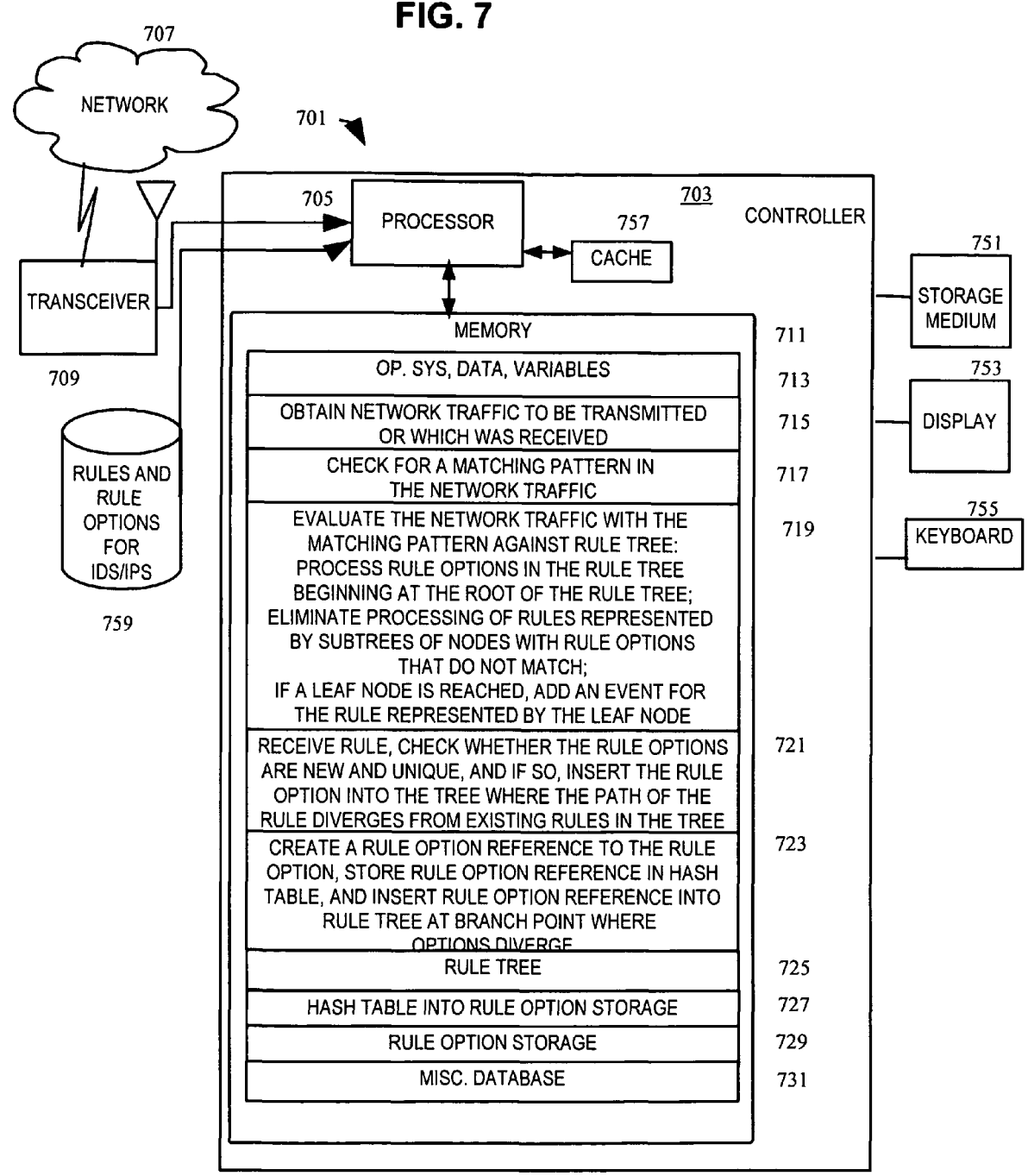
FIG. 7 is a block diagram illustrating components of a computer system related to rule tree processing.

Referring now to FIG. 7, a block diagram illustrating components of a computer system related to rule tree processing will be discussed and described. The computer system 701 may include one or more controllers 703, which can transmit and/or receive communications from a network 707 over a transceiver 709 in accordance with known techniques. The controller 703 can include a processor 705, a memory 711, a cache memory 757, an optional storage medium 751 (for example, CD-ROM (compact disc read only memory), CD (compact disc), optical disk, USB (universal serial bus) storage, or the like), an optional display 753, and/or an optional user input device such as a keyboard 755. Data and/or computer programs can be read from/to the optional storage medium 751 and to/from the memory 711. The computer system also can include a conventional database of rules and rule options for use in connection with a IDS and/or IPS 759, for example, a full collection of SNORT rules. Typically, the full collection of SNORT rules is so large that it cannot be loaded into the processor 705 or its memory 711.

The processor 705 may comprise one or more microprocessors and/or one or more digital signal processors. The memory 711 may be coupled to the processor 705 and may comprise a read-only memory (ROM), a random-access memory (RAM), a programmable ROM (PROM), and/or an electrically erasable read-only memory (EEPROM). The memory 711 may include multiple memory locations for storing, among other things, an operating system, data and variables 713 for programs executed by the processor; computer programs for causing the processor to operate in connection with various functions such as obtaining network traffic 715, checking for a matching pattern in the network traffic 717, evaluating the network traffic with the matching pattern against a rule tree 719, receiving a rule and inserting rule options of the rule into the rule tree if appropriate 721, and creating a rule option reference to the rule option and storing the rule option reference into the rule tree 723; and/or other processing such as defining rules (e.g., SNORT rules) and performing other IDS/IPS functionality; a rule tree 725, a hash table into rule option storage 727, a rule option storage 729; and a database 243 for other information used by the processor 705. The computer programs may be stored, for example, in ROM or PROM and may direct the processor in controlling the operation of the computer system 701.

The overall process of evaluating network traffic using rule trees includes, at an upper level, functions for obtaining network traffic 715, checking for a matching pattern 717, and evaluating the network traffic (e.g., the packet) against the rule tree 719. These are particularized in the following.

The processor 705 may be programmed for obtaining network traffic 715 to be transmitted over the transceiver 709, or which was received from the network 707 over the transceiver 709. The network traffic 715 contains packets that are to be processed, and is obtained in accordance with known techniques.

The processor 705 may be programmed for checking for a matching pattern in the network traffic 717. When a pattern matches (e.g., when an endstate of the pattern matcher state table is reached), then the packet with that pattern is to be evaluated against rules that are associated with that endstate. Known techniques can be used for matching patterns in the network traffic, and for determining the rules that are to be evaluated.

The processor 705 may be programmed for evaluating the network traffic with the matching pattern against a rule tree 719. As has been more fully described herein, the evaluation includes processing rules options in the rule tree beginning at the root of the rule tree; eliminating the processing of rules represented by subtrees of nodes with rule options that do not match; and if a leaf node is reached (that is, the rule options for the rule have matched), adding an event (or taking other appropriate action) for the rule represented by the leaf node.

The overall process of creating a rule tree is generally addressed in the function for inserting the rule option(s) into the tree 721, or more particularly, using a hash table and references for inserting the rule option(s) into the tree 723, as follows.

The processor 705 may be programmed for receiving 721 a rule and inserting rule options of the rule into the rule tree if appropriate. This has also been more fully described herein. The processor 705 receives a rule, checks whether the rule options are new and unique, and if so, inserts the rule option into the tree where the path of the rule diverges from existing rules in the tree.

The processor 705 may be programmed for creating 723 a rule option reference to the rule option and storing the rule option reference into the rule tree. As further described herein, the processor 705 creates a rule option reference to the rule option, stores the rule option reference in a hash table, and inserts the rule option reference into the rule tree at a branch point where the rule options diverge.

It should be understood that various logical groupings of functions are described herein. Different realizations may omit one or more of these logical groupings. Likewise, in various realizations, functions may be grouped differently, combined, or augmented. Furthermore, functions including those identified as optional can be omitted from various realizations. Similarly, the present description may describe or suggest a database, table or other type of collection of data and information. One or more embodiments can provide that the table, database, and/or collection of data and information can be distributed, combined, or augmented, or provided locally (as illustrated) and/or remotely (not illustrated).

Figure 8:
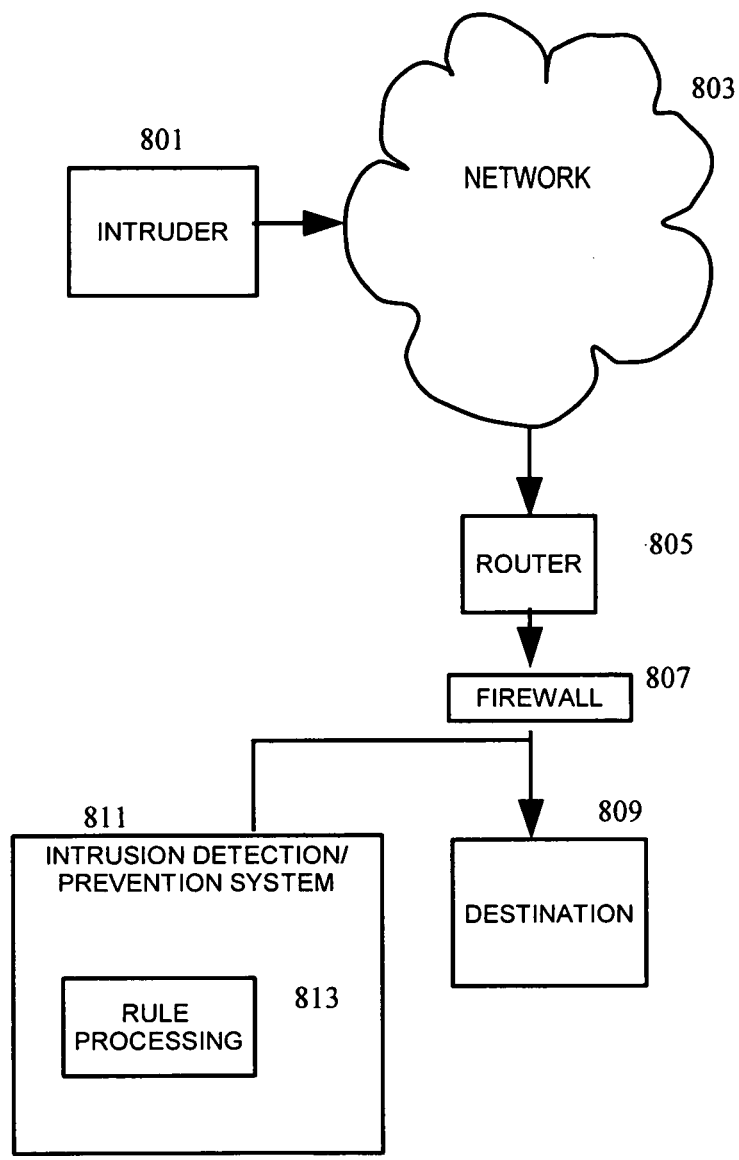
FIG. 8 is a block diagram illustrating a computer system with intrusion detection/prevention.

Referring now to FIG. 8, a block diagram illustrating a computer system with intrusion detection/prevention will be discussed and described. In the illustration, an intruder 801 (such as a computer system) transmits one or more packets, as part of network traffic, to a destination 809 via a network 803, a router 805, and a firewall 807. The network traffic including the packets to the destination 809 can be monitored in accordance with well known techniques by an intrusion detection/prevention system 811. Alternatively, the intrusion detection/prevention system 811 can be provided in-line with the destination 809, or can be incorporated into the destination 809. The intrusion detection/prevention system 811 can be a computer system, for example, that discussed in connection with FIG. 7 or similar, and can include rule processing 813 for evaluating the packet included in the network traffic, such as discussed herein in connection with FIG. 9 and FIG. 10.

Figure 9:
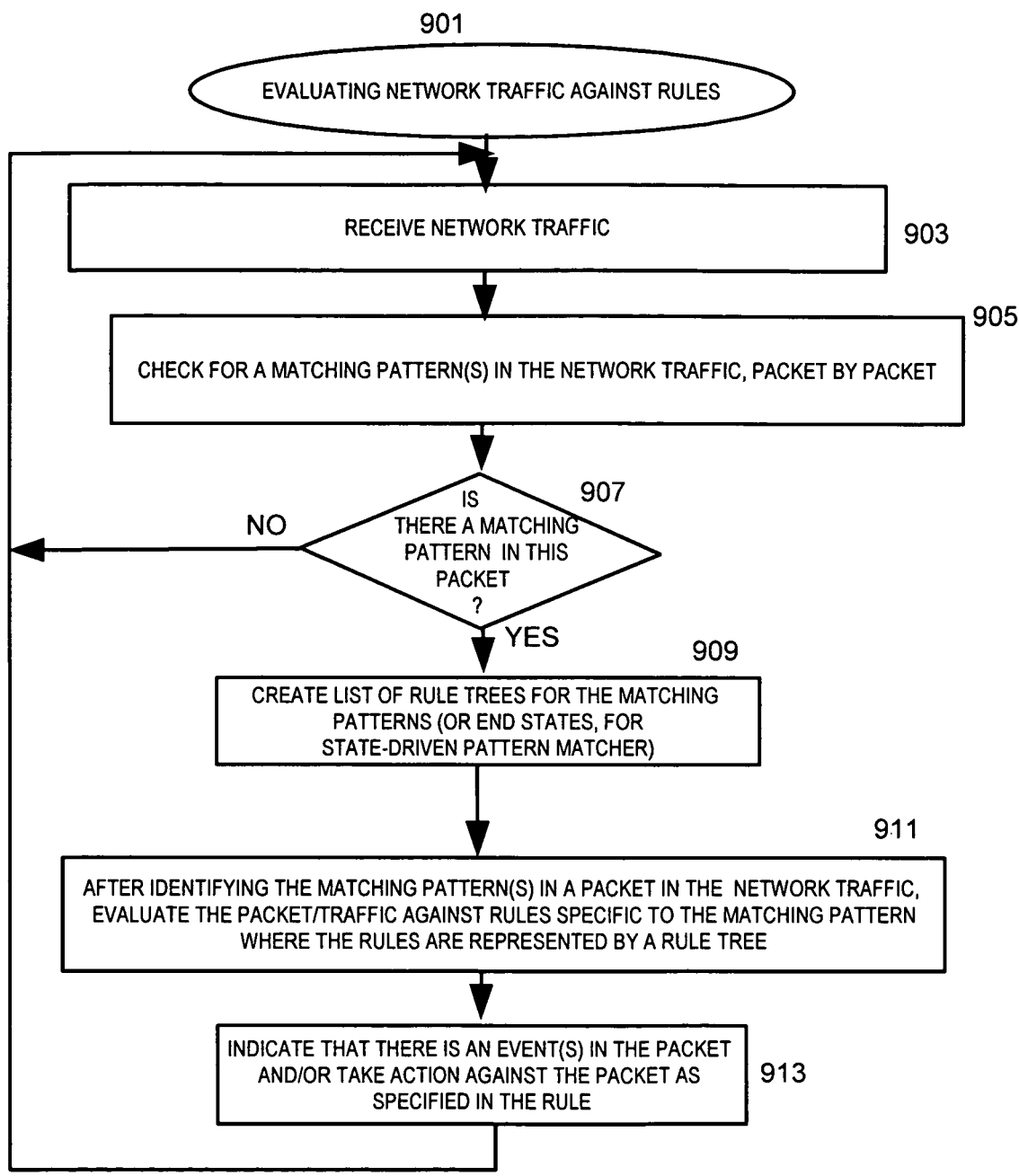
FIG. 9 is a flow chart illustrating a procedure for evaluating network traffic against rules.
Figure 10:
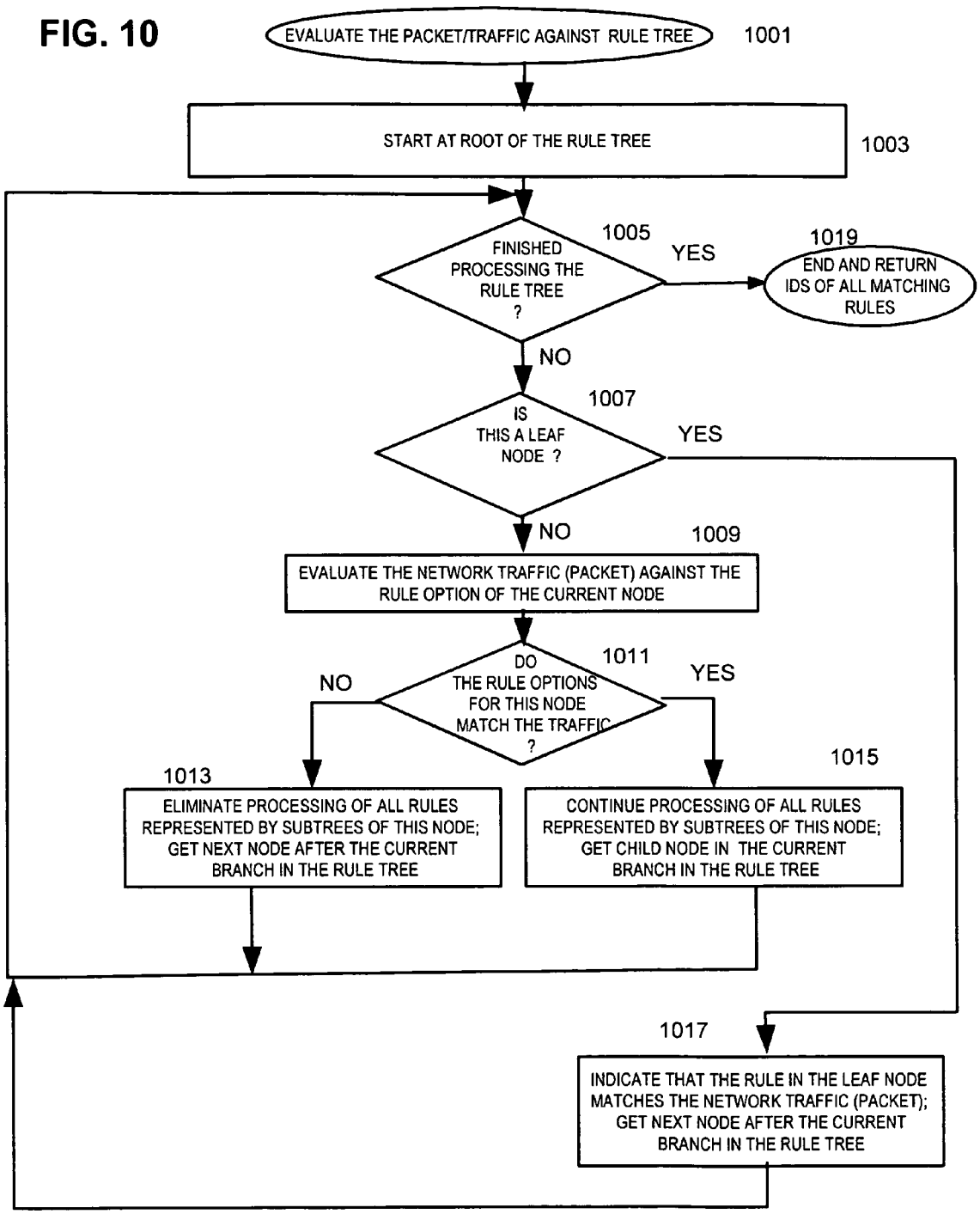
FIG. 10 is a flow chart illustrating a procedure for evaluating the packet/network traffic against a rule tree.

Referring now to FIG. 9, a flow chart illustrating a procedure for evaluating network traffic against rules will be discussed and described. FIG. 10 provides additional detail with regard to the rule tree as used in the procedure of FIG. 9. The procedures of FIG. 9 and FIG. 10 can advantageously be implemented on, for example, a processor of a controller, described in connection with FIG. 2 or other apparatus appropriately arranged. Much of the details relating to the following have been discussed in detail above; such detailed discussions will not be repeated.

The procedure 901 for evaluating network traffic against rules can include receiving 903 the network traffic. As is well understood, the network traffic can arrive in packets.

Then, the procedure 901 checks 905 for a matching pattern(s) in the network traffic, packet by packet. That is, the network traffic, or more specifically, individual packets in the network traffic, is checked for patterns which suggest that it is involved in an attack or intrusion. If 907 there was no matching pattern in a packet, the procedure 901 can simply loop to continue receiving more network traffic 903 and checking 905 for patterns in the subsequent packets.

However, if 907 there is a matching pattern in the packet, then the packet is further checked against the rules. That is, the procedure creates 909 a list of rule trees, evaluates 911 the packet against the rule tree, and indicates 913 any event or action against the packet as specified in the rule(s) matched by the rule tree evaluation.

More particularly, the process to create 909 the list of rule trees includes listing the matching patterns (or endstates, if the pattern matcher uses a state machine); and creating a list of rule trees corresponding to the matching patterns (or end states).

After identifying the matching pattern(s) in the packet in the network traffic, the process evaluates 911 the packet in the network traffic against the rules specific to the matching pattern, where the rules are represented by a rule tree. A more detailed outline of the evaluation process is discussed in connection with FIG. 10. Although the present discussion assumes that there is a single rule tree, embodiments can accommodate plural rule trees, for example, where there are different root nodes because the processing at the root level is different.

The process then indicates 913 any event or action against the packet as specified in the rule(s) matched by the rule tree evaluation.

Referring now to FIG. 10, a flow chart illustrating a procedure for evaluating the packet/network traffic against a rule tree will be discussed and described. In overview, the evaluation includes evaluating the current packet, branch-by-branch, but prunes those nodes (in a branch) from evaluation that have a parent node that failed to match.

Starting 1003 at the root of the rule tree which was created from rules which are relevant to the matched pattern, the process 1001 will evaluate 1009 the current network traffic (that is, a current packet in the network traffic) against the rule option of the current node. For example, the root node includes a reference to a rule option stored in a rule option storage. The process follows the reference in the node indicating the rule option, to a hash table, and from the hash table obtains the rule option from the rule option storage. Once obtained, the packet is evaluated against the rule option according to known techniques.

If 1011 the rule option for the current node does not match the packet, then the process eliminates 1013 processing of all rules represented by subtrees of the current node. It does this by not traversing the subtrees of the current node. The process then gets the next sibling node after the current branch in the rule tree, or otherwise gets to a different branch of the rule tree.

On the other hand, if 1011 the rule option for the current node matches the packet, then the process continues 1015 processing of rules represented by subtrees of the current node. It does this by getting the child node of the current node in the current branch in the rule tree.

Processing then loops back, and checks to see if 1005 the rule tree is finished being processed. If the rule tree is finished processing, then the process ends 1019, and can return the identities of any fully matching rules if they have not already been notified.

If 1005 the rule tree is not finished being processed, then the process checks 1007 whether the current node is a leaf node. If the process has arrived at a leaf node, then all of the rule options for the rule were matched and the rule itself is matched. Consequently, the process will indicate 1017 that the rule in the leaf node (identified by the signature ID number) matches the network traffic (or more particularly, the current packet). Also, the process can reference the rule and determine the action which should be taken, or can provide an event identifying the rule to be handled by the IDS/IPS as usual. Then, the process can get the next sibling node after the current branch in the rule tree, so as to attempt to process the next branch of the rule tree (see label 1005).

If 1007 the node is not a leaf node, then the process will loop to evaluate 1009 the network traffic (packet) against the rule option, and continue with the other processing as discussed above.

Moreover, one or more embodiments provide a computer-readable medium comprising instructions being executed by a computer, the instructions including a computer-implemented method for evaluating network traffic against rules, the instructions for implementing the foregoing method.

It should be noted that the networks of interest include those that transmit information in packets, for example, those known as packet switching networks that transmit data, where data can be divided into packets before transmission, the packets are transmitted, and the packets are routed over network infrastructure devices, which are sent to a destination. Such networks include, by way of example, the Internet, intranets, local area networks (LAN), wireless LANs (WLAN), wide area networks (WAN), and others. Protocols supporting networks that utilize packets include one or more of various networking protocols having any link layers that support the TCP transport layer, or any application that rides over the transport layer, and other wireless application protocols or wireline application protocols and/or other protocol structures, and variants and evolutions thereof. Such networks can provide wireless communication capability and/or utilize wireline connections such as cable and/or a connector, or similar.

Furthermore, the designations "intrusion detection system" (IDS) or "intrusion prevention system" (IPS), and IDS/IPS are used herein to denote a device or software that passively or actively analyzes network traffic for intrusions, also referred to herein as "attacks". Examples of such devices or software are sometimes referred to as "intrusion detection system", "intrusion prevention system", "network intrusion detection system", "network intrusion protection system", and the like, and variants or evolutions thereof. An IDS/IPS may be host-based, or may monitor traffic to a target system using, for example, sensors, anywhere between the target system and the intruder, typically after a final router or firewall, or in other software or device which incorporates an intrusion detection/prevention function, such as a firewall, proxy, or the like.

The designation "network traffic" is used herein to indicate data in a network that is encapsulated in a packet.

The designation "matching pattern" is used herein to indicate an identical bit string pattern, which can be identified using any of various conventional techniques known as string searching, text searching, or string matching. Thus, a "matching pattern in the network traffic" would be a string of bits in the network traffic that is identical to a pre-determined pattern.

The designation "rule option" is used herein specifically to mean a pre-determined indication of the part of the packet that is to be tested together with any parameters (such as particular bit patterns) that are tested for their presence in the specified part of the packet. The term "rule" is used herein to specify a pre-determined collection of one or more rule options, and a rule action that specifies the action to take if all of the rule options are true for a packet. A rule optionally may also specify IP address, Internet protocol (e.g., UDP, TCP), and/or port number that are also tested for their presence in the packet. Advantageously, a "rule option" and/or a rule can be pre-defined according to a rule definition language, more particularly, the SNORT™ rule structure.

The term "attack" as used herein indicate activity or intrusions that are typically malicious, referred to as, for example, denial of service attacks, port scans, intrusions, evasions, attempts to hack into a computer, unauthorized downloads or accesses, and other variations, which have occurred.

Also, the designation "configuration" as used herein indicates the settings and software of a particular computer or device on a network, for example, type and version of operating system, types and versions of services running or installed on the computer or device, types and versions of client applications running or installed on the computer or device, TCP and/or UDP protocols used by the computer or device, other settings and software on the computer or device that can affect the security of a computer or network, and the like, as may be understood and/or varied from time-to-time.

The term "vulnerability" indicates a weakness in a system that can be exploited by an attacker to violate the integrity of that system. Vulnerabilities may result from, for example, software bugs and design flaws, operating system flaws, passwords, backdoors, malware such as a computer virus, a script code injection, or the like. Vulnerabilities of a particular computer system can be determined in various ways, including from a known configuration of that particular computer system, since certain configurations can be determined to be corresponding vulnerabilities. Various commercially available software and/or websites can provide information indicating known vulnerabilities; various commercially available technology can identify specific vulnerabilities in a particular computer system.

The term "IP address" (Internet Protocol address) as used herein is a unique address that devices on a network use in order to identify and communicate with each other on a utilizing the Internet Protocol standards (for example, IPv4 or IPv6, further specified in RFC 791, 1519, 1918, 1, 2, 4291), variants, and evolutions thereof, and can include, for example, a dynamic IP address, a static IP address, possibly translated by a network address translator (NAT). The IP address can act as a locator for devices within the network to locate each other, and is unique within the scope of the specific network, such as the global Internet, or a local area network, or an enterprise network.

The following provides a basic primer on SNORT rule structure but is exemplary rather than limiting; the designation "SNORT™ rule structure" as used herein is intended to cover SNORT rules for SNORT 2.8.2, earlier versions of SNORT, and subsequent variations, updates and expansions. SNORT uses a simple, lightweight rules description language that is flexible and quite powerful. SNORT rules are divided into two logical sections, the rule header and the rule options. The rule header contains the rule's action, protocol, source and destination IP addresses and netmasks, and the source and destination ports information. The rule option section contains alert messages and information on which parts of the packet should be inspected to determine if the rule action should be taken.

Here is Example Rule #1:
alert tcp any any→192.168.1.0/24 111 (content:"|00 01 86 a5|"; msg: "mountd access";)

The text up to the first parenthesis is the rule header and the section enclosed in parenthesis is the rule options. The words before the colons in the rule options section are called option keywords. Note that the rule options section is not specifically required by any rule, they are just used for the sake of making tighter definitions of packets to collect or alert on (or drop, for that matter). All of the elements in that make up a rule must be true for the indicated rule action to be taken. When taken together, the elements can be considered to form a logical AND statement. At the same time, the various rules in a SNORT rules library file can be considered to form a large logical OR statement. Let's begin by talking about the rule header section.

The rule header contains the information that defines the "who, where, and what" of a packet, as well as what to do in the event that a packet with all the attributes indicated in the rule should show up. The first item in a rule is the rule action. The rule action tells SNORT what to do when it finds a packet that matches the rule criteria. There are four available actions in SNORT, alert, log, pass and drop:

alert—generate an alert using the selected alert method, and then log the packet
    log—log the packet
    pass—drop (ignore) the packet
    drop—specific to IPS—block the packet The next field in a rule header is the protocol. There are three IP protocols that SNORT currently analyzes for suspicious behavior, tcp, udp, and icmp. In the future there may be more, such as ARP, IGRP, GRE, OSPF, RIP, IPX, etc.
    tcp
    udp
    icmp The next portion of the rule header deals with the IP address and port information for a given rule. The keyword "any" may be used to define any address. SNORT does not have a mechanism to provide host name lookup for the IP address fields in the rules file. The addresses are formed by a straight numeric IP address and a CIDR block. The CIDR block indicates the netmask that should be applied to the rule's address and any incoming packets that are tested against the rule. A CIDR block mask of /24 indicates a Class C network, /16 a Class B network, and /32 indicates a specific machine address. For example, the address/CIDR combination 192.168.1.0/24 would signify the block of addresses from 192.168.1.1 to 192.168.1.255. Any rule that used this designation for, say, the destination address would match on any address in that range. The CIDR designations give us a nice short-hand way to designate large address spaces with just a few characters.

In Example Rule #1 (above), the source IP address was set to match for any computer talking, and the destination address was set to match on the 192.168.1.0 Class C network.

Port numbers may be specified in a number of ways, including "any" ports, static port definitions, ranges, and by negation. "Any" ports are a wildcard value, meaning literally any port. Static ports are indicated by a single port number, such as 111 for portmapper, 23 for telnet, or 80 for http, etc. Port ranges are indicated with the range operator ":". The range operator may be applied in a number of ways to take on different meanings, such as in the following Port Range Examples:

Range Example #1:
    log udp any any→192.168.1.0/24 1:1024
log udp traffic coming from any port and destination ports ranging from 1 to 1024
    Port Range Example #2:
    log tcp any any→192.168.1.0/24:6000
log tcp traffic from any port going to ports less than or equal to 6000
    Port Range Example #3:
    log tcp any :1024→192.168.1.0/24 500:
log tcp traffic from privileged ports less than or equal to 1024 going to ports greater than or equal to 500

Port negation is indicated by using the negation operator "!". The negation operator may be applied against any of the other rule types (except any, which would translate to none, how Zen . . . ). For example, to log everything except the X Windows ports, one could do the following rule:
    log tcp any any→192.168.1.0/24 !6000:6010

The direction operator "→" indicates the orientation, or "direction", of the traffic that the rule applies to. The IP address and port numbers on the left side of the direction operator is considered to be the traffic coming from the source host, and the address and port information on the right side of the operator is the destination host. There is also a bidirectional operator, which is indicated with a ""<>"" symbol. This tells SNORT to consider the address/port pairs in either the source or destination orientation. This is handy for recording/analyzing both sides of a conversation, such as telnet or POP3 sessions. An example of the bidirectional operator being used to record both sides of a telnet session is:
    log !192.168.1.0/24 any "<>" 192.168.1.0/24 23

Rule options form the heart of SNORT's intrusion detection engine, combining ease of use with power and flexibility. All SNORT rule options are separated from each other using the semicolon ";" character. Rule options include keywords and arguments; rule option keywords are separated from their arguments with a colon ":" character. The following examples are some of the rule option keywords available for SNORT:
    msg—prints a message in alerts and packet logs
    logto—log the packet to a user specified filename instead of the standard output file
    minfrag—set a threshold value for the smallest acceptable IP fragment size
    ttl—test the IP header's TTL field value
    id—test the IP header's fragment ID field for a specific value
    dsize—test the packet's payload size against a value
    content—search for a pattern in the packet's payload
    offset—modifier for the content option, sets the offset to begin attempting a pattern match
    depth—modifier for the content option, sets the maximum search depth for a pattern match attempt
    flags—test the TCP flags for certain values
    seq—test the TCP sequence number field for a specific value
    ack—test the TCP acknowledgement field for a specific value
    itype—test the ICMP type field against a specific value
    icode—test the ICMP code field against a specific value
    session—dumps the application layer information for a given session This disclosure is intended to explain how to fashion and use various embodiments in accordance with the invention rather than to limit the true, intended, and fair scope and spirit thereof. The invention is defined solely by the appended claims, as they may be amended during the pendency of this application for patent, and all equivalents thereof. The foregoing description is not intended to be exhaustive or to limit the invention to the precise form disclosed. Modifications or variations are possible in light of the above teachings. The embodiment(s) was chosen and described to provide the best illustration of the principles of the invention and its practical application, and to enable one of ordinary skill in the art to utilize the invention in various embodiments and with various modifications as are suited to the particular use contemplated. All such modifications and variations are within the scope of the invention as determined by the appended claims, as may be amended during the pendency of this application for patent, and all equivalents thereof, when interpreted in accordance with the breadth to which they are fairly, legally, and equitably entitled.

What is claimed is:

1. A method, performed in an intrusion detection/prevention system in a computer system, for evaluating network traffic against rules, comprising:

receiving network traffic;

checking for a matching pattern in a packet in the network traffic using a state machine and a fast pattern matcher based on attack signatures, in which matching patterns being searched each corresponds to one or more attacks;

adding, to an array of matching end states, a matching end state corresponding to the matching pattern found in the packet, when the matching pattern is found in the network traffic by the fast pattern matcher;

the checking and adding being performed until the fast pattern matcher has completed a full pass over data in the packet or the array is full of matching end states;

creating a list of rule trees that correspond to the matching end states in the array of matching end states, when the fast pattern matcher has completed the full pass over data in the packet or when the array is full;

evaluating the packet in the network traffic with the matching pattern against each rule tree in the list of rule trees that correspond to the matching end states, wherein each of the rule trees corresponds to a different one of the matching patterns, wherein one of the matching patterns in the network traffic corresponds to plural rules, wherein references to rule options are represented in the rule trees and the rule options are stored separately from the rule trees, the rule tree representing each unique rule by each unique path from a root of the tree to each of the leaf nodes, and the rule tree representing a rule option as a non-leaf node of the rule tree, the evaluating of the network traffic including:

processing, against the network traffic, the rule options in the rule tree beginning at the root of the rule tree;

wherein processing of all of the rules represented by the subtrees of nodes with rule options that do not match are eliminated, wherein the network traffic is evaluated against rules terminating in leaf nodes only for combinations of rule options which match the network traffic.

2. The method according to claim 1, wherein if a rule option in a node of the rule tree does not match the network traffic, then not evaluating the options in the subtree of the node with the rule option that does not match;

for the rule options which match the network traffic, then continuing to process rule options in the subtree of the nodes with the rule options that match the network traffic, and adding an event to be processed by the intrusion detection/prevention system as an attack or intrusion when the rule represented by one of the leaf nodes matches the traffic.

3. The method according to claim 1, wherein the root of the tree begins all rules that include the same rule option of the root, a branch in the tree is where a rule option of the rules diverges, and the rule options beyond the divergence are stored as a linear subtree after the point of divergence.

4. The method according to claim 1, further comprising receiving a rule, checking whether the rule options in the rule are new and unique, and if new and unique, then inserting the rule option into the tree where the path of the rule diverges from existing rules in the rule tree.

5. The method according to claim 4, wherein the inserting of the rule option into the tree includes creating a rule option reference to the rule option, storing the rule option reference in a hash table, and inserting the rule option reference into the tree at a branch point where the rule options in the rule diverge from previous rule options in the rule tree.

6. The method according to claim 1, wherein the rule options are stored separately in a rule option storage, wherein the references to the rule options in the nodes of the rule tree are references into a hash table of the rule option storage.

7. The method according to claim 1, wherein the rules and the rule options are prepared in accordance with SNORT™ rule structure.

8. A non-transitory computer-readable storage medium comprising instructions being executed by a computer in connection with an intrusion detection/prevention system, the instructions including a computer-implemented method for evaluating network traffic against rules, the instructions for implementing:

receiving network traffic;

checking for a matching pattern in a packet in the network traffic using a state machine and a fast pattern matcher based on attack signatures, in which matching patterns being searched each corresponds to one or more attacks;

adding, to an array of matching end states, a matching end state corresponding to the matching pattern found in the packet, when the matching pattern is found in the network traffic by the fast pattern matcher;

the checking and adding being performed until the fast pattern matcher has completed a full pass over data in the packet or the array is full of matching end states;

creating a list of rule trees that correspond to the matching end states in the array of matching end states, when the fast pattern matcher has completed the full pass over data in the packet or when the array is full;

evaluating the packet in the network traffic with the matching pattern against each rule tree in the list of rule trees that correspond to the matching end states, wherein each of the rule trees corresponds to a different one of the matching patterns, wherein one of the matching patterns in the network traffic corresponds to plural rules, wherein references to rule options are represented in the rule trees and the rule options are stored separately from the rule trees, the rule tree representing each unique rule by each unique path from a root of the tree to each of the leaf nodes, and the rule tree representing a rule option as a non-leaf node of the rule tree, the evaluating of the network traffic including:

processing, against the network traffic, the rule options in the rule tree beginning at the root of the rule tree;

wherein processing of all of the rules represented by the subtrees of nodes with rule options that do not match are eliminated, wherein network traffic is evaluated against rules terminating in leaf nodes only for combinations of rule options which match the network traffic.

9. The non-transitory computer-readable storage medium according to claim 8, wherein if a rule option in a node of the rule tree does not match the network traffic, then not evaluating the options in the subtree of the node with the rule option that does not match;

for the rule options which match the network traffic, then continuing to process rule options in the subtree of the nodes with the rule options that match the network traffic, and adding an event to be processed by the intrusion detection/prevention system as an attack or intrusion when the rule represented by one of the leaf nodes matches the traffic.

10. The non-transitory computer-readable storage medium according to claim 8, the root of the tree begins all rules that include the same rule option of the root, a branch in the tree is where a rule option of the rules diverges, and the rule options beyond the divergence are stored as a linear subtree after the point of divergence.

11. The non-transitory computer-readable storage medium according to claim 8, further comprising instructions for receiving a rule, checking whether the rule options in the rule are new and unique, and if new and unique, then inserting the rule option into the tree where the path of the rule diverges from existing rules in the rule tree.

12. The non-transitory computer-readable storage medium according to claim 11, wherein the inserting of the rule option into the tree includes creating a rule option reference to the rule option, storing the rule option reference in a hash table, and inserting the rule option reference into the tree at a branch point where the rule options in the rule diverge from previous rule options in the rule tree.

13. The non-transitory computer-readable storage medium according to claim 8, wherein the rule options are stored separately in a rule option storage, wherein the references to the rule options in the nodes of the rule tree are references into a hash table of the rule option storage.

14. A computer system for evaluating network traffic against rules in connection with an intrusion detection/prevention system, comprising:
(A) a transceiver operable to receive or transmit network traffic; and
(B) a processor cooperatively operable with the memory and the transceiver, and configured to facilitate:
obtaining network traffic to be transmitted on the transceiver or which was received by the transceiver;
checking for a matching pattern in a packet in the network traffic using a state machine and a fast pattern matcher based on attack signatures, in which matching patterns being searched each corresponds to one or more attacks;
adding, to an array of matching end states, a matching end state corresponding to the matching pattern found in the packet, when the matching pattern is found in the network traffic by the fast pattern matcher;
the checking and adding being performed until the fast pattern matcher has completed full pass over data in the packet or the array is full of matching end states;
creating a list of rule trees that correspond to the matching end states in the array of matching end states, when the fast pattern matcher has completed the full pass over data in the packet or when the array is full;
evaluating the packet in the network traffic with the matching pattern against each rule tree in the list of rule trees that correspond to the matching end states, wherein each of the rule trees corresponds to a different one of the matching patterns, wherein one of the matching patterns in the network traffic corresponds to plural rules, wherein references to rule options are represented in the rule trees and the rule options are stored separately from the rule trees, the rule tree representing each unique rule by each unique path from a root of the tree to each of the leaf nodes, and the rule tree representing a rule option as a non-leaf node of the rule tree, the evaluating of the network traffic including:
processing, against the network traffic, the rule options in the rule tree beginning at the root of the rule tree;
wherein processing of all of the rules represented by the subtrees of nodes with rule options that do not match are eliminated,
wherein network traffic is evaluated against rules terminating in leaf nodes only for combinations of rule options which match the network traffic.

15. The computer system according to claim 14, wherein if a rule option in a node of the rule tree does not match the network traffic, then not evaluating the options in the subtree of the node with the rule option that does not match;
for the rule options which match the network traffic, then continuing to process rule options in the subtree of the nodes with the rule options that match the network traffic, and adding an event to be processed by the intrusion detection/prevention system as an attack or intrusion when the rule represented by one of the leaf nodes matches the traffic.

16. The computer system according to claim 14, wherein the root of the tree begins all rules that include the same rule option of the root, a branch in the tree is where a rule option of the rules diverges, and the rule options beyond the divergence are stored as a linear subtree after the point of divergence.

17. The computer system according to claim 14, further comprising receiving a rule, checking whether the rule options in the rule are new and unique, and if new and unique, then inserting the rule option into the tree where the path of the rule diverges from existing rules in the rule tree.

18. The computer system according to claim 17, wherein the inserting of the rule option into the tree includes creating a rule option reference to the rule option, storing the rule option reference in a hash table, and inserting the rule option reference into the tree at a branch point where the rule options in the rule diverge from previous rule options in the rule tree.

19. The computer system according to claim 17, wherein the rule options are stored separately in a rule option storage, wherein the references to the rule options in the nodes of the rule tree are references into a hash table of the rule option storage.

20. The computer system according to claim 17, wherein the rules and the rule options are prepared in accordance with SNORT™ rule structure.

21. The method according to claim 1, wherein
the checking for the matching pattern based on the attack signatures is performed in a first pass of the network traffic that selects the rules specific to the matching pattern; and
the evaluating of the network traffic against rules specific to the attack that corresponds to the matching pattern only for combinations of rule options which match the network traffic is performed in a subsequent pass of the same network traffic after the first pass of the network traffic.

22. The non-transitory computer-readable storage medium according to claim 8, wherein
the checking for the matching pattern based on attack signatures is performed in a first pass of the network traffic that selects the rules specific to the matching pattern; and
the evaluating of the network traffic against rules specific to the attack that corresponds to the matching pattern only for combinations of rule options which match the network traffic is performed in a subsequent pass of the same network traffic after the first pass of the network traffic.

23. The computer system according to claim 14, wherein
the processor performs the checking for the matching pattern based on the attack signatures in a first pass of the network traffic that selects the rules specific to the matching pattern; and
the processor performs the evaluating of the network traffic against rules specific to the attack that corresponds to the matching pattern only for combinations of rule options which match the network traffic in a subsequent pass of the same network traffic after the first pass of the network traffic.

* * * * *